(12) United States Patent
Tsunekawa

(10) Patent No.: US 8,581,776 B2
(45) Date of Patent: Nov. 12, 2013

(54) RADAR SYSTEM

(75) Inventor: Jun Tsunekawa, Nagoya (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 153 days.

(21) Appl. No.: 13/123,914

(22) PCT Filed: Dec. 18, 2008

(86) PCT No.: PCT/JP2008/003839
§ 371 (c)(1),
(2), (4) Date: Apr. 13, 2011

(87) PCT Pub. No.: WO2010/070708
PCT Pub. Date: Jun. 24, 2010

(65) Prior Publication Data
US 2011/0285574 A1    Nov. 24, 2011

(51) Int. Cl.
*G01S 13/00* (2006.01)
*G01S 13/08* (2006.01)
*G01S 13/58* (2006.01)

(52) U.S. Cl.
USPC ............ 342/70; 342/95; 342/104; 342/105

(58) Field of Classification Search
USPC ............ 342/70–72, 94–97, 104, 105, 115; 701/45, 117–122; 340/901–903, 436
See application file for complete search history.

(56) References Cited

U.S. PATENT DOCUMENTS

| | | | | |
|---|---|---|---|---|
| 4,450,446 A | * | 5/1984 | Clancy et al. | 342/98 |
| 5,239,515 A | * | 8/1993 | Borenstein et al. | 367/87 |
| 5,374,932 A | * | 12/1994 | Wyschogrod et al. | 342/36 |
| 5,422,830 A | * | 6/1995 | Post | 348/169 |
| 5,461,357 A | * | 10/1995 | Yoshioka et al. | 340/435 |
| 5,479,360 A | * | 12/1995 | Seif et al. | 342/161 |
| 5,493,302 A | * | 2/1996 | Woll et al. | 342/71 |

(Continued)

FOREIGN PATENT DOCUMENTS

| | | |
|---|---|---|
| JP | 7 318652 | 12/1995 |
| JP | 7-318652 A | 12/1995 |

(Continued)

OTHER PUBLICATIONS

International Search Report issued Jan. 27, 2009 in PCT/JP08/03839 filed Dec. 18, 2008.

*Primary Examiner* — Jack W Keith
*Assistant Examiner* — Peter Bythrow
(74) *Attorney, Agent, or Firm* — Oblon, Spivak, McClelland, Maier & Neustadt, L.L.P.

(57) ABSTRACT

Provided is a radar system which calculates a track of a detected object and can determine whether or not the track is accurate. The radar system includes: a radar section for emitting an electromagnetic wave to an object and receiving a reflected wave reflected from the object to detect position information of the object; a track calculation section for calculating, periodically at a first cycle, a track along which the object moves, on the basis of the position information obtained from the radar section; a first speed calculation section for calculating a first speed at which the object moves, on the basis of pieces of the position information at two different time points having a time interval which is longer than the first cycle; and a track determination section for determining whether or not the track is accurate, on the basis of at least the first speed.

6 Claims, 13 Drawing Sheets

(56) References Cited

U.S. PATENT DOCUMENTS

| | | | |
|---|---|---|---|
| 5,574,463 A * | 11/1996 | Shirai et al. | 342/70 |
| 5,600,561 A * | 2/1997 | Okamura | 701/300 |
| 5,612,699 A * | 3/1997 | Yamada | 342/70 |
| 5,617,085 A * | 4/1997 | Tsutsumi et al. | 340/903 |
| 5,631,654 A * | 5/1997 | Karr | 342/107 |
| 5,689,250 A * | 11/1997 | Kremser | 340/904 |
| 5,754,099 A * | 5/1998 | Nishimura et al. | 340/435 |
| 5,798,727 A * | 8/1998 | Shirai et al. | 342/70 |
| 5,931,547 A * | 8/1999 | Lerner | 303/193 |
| 6,061,001 A * | 5/2000 | Sugimoto | 340/903 |
| 6,097,332 A * | 8/2000 | Crosby, II | 342/72 |
| 6,246,949 B1 * | 6/2001 | Shirai et al. | 701/96 |
| 6,301,530 B1 * | 10/2001 | Tamura | 701/23 |
| 6,323,802 B1 * | 11/2001 | Tokoro | 342/70 |
| 6,420,997 B1 * | 7/2002 | Cong | 342/70 |
| 6,498,972 B1 * | 12/2002 | Rao et al. | 701/45 |
| 6,628,227 B1 * | 9/2003 | Rao et al. | 342/70 |
| 6,888,622 B2 * | 5/2005 | Shimomura | 356/4.01 |
| 6,889,140 B2 * | 5/2005 | Isogai et al. | 701/301 |
| 7,009,500 B2 * | 3/2006 | Rao et al. | 340/435 |
| 7,026,979 B2 * | 4/2006 | Khosla | 342/90 |
| 7,034,742 B2 * | 4/2006 | Cong et al. | 342/70 |
| 7,081,849 B2 * | 7/2006 | Collins et al. | 342/160 |
| 7,218,270 B1 * | 5/2007 | Tamburino | 342/96 |
| 7,509,217 B2 * | 3/2009 | Endoh | 701/300 |
| 7,522,091 B2 * | 4/2009 | Cong et al. | 342/70 |
| 7,911,374 B2 * | 3/2011 | Moriuchi et al. | 342/70 |
| 8,022,862 B2 * | 9/2011 | Larocque et al. | 342/94 |
| 8,102,308 B2 * | 1/2012 | Tsunekawa | 342/107 |
| 8,125,372 B2 * | 2/2012 | Focke et al. | 342/70 |
| 8,154,437 B2 * | 4/2012 | Tsunekawa | 342/107 |
| 8,248,295 B2 * | 8/2012 | Tsunekawa | 342/70 |
| 8,378,883 B2 * | 2/2013 | Kuoch | 342/70 |
| 2002/0008657 A1 * | 1/2002 | Poore, Jr. | 342/96 |
| 2002/0017415 A1 * | 2/2002 | Campbell et al. | 180/271 |
| 2003/0218563 A1 * | 11/2003 | Miyahara | 342/70 |
| 2005/0001759 A1 * | 1/2005 | Khosla | 342/90 |
| 2005/0174282 A1 * | 8/2005 | Nakanishi et al. | 342/109 |
| 2005/0184904 A1 * | 8/2005 | Humphries et al. | 342/357.07 |
| 2005/0285773 A1 * | 12/2005 | Hartzstein et al. | 342/70 |
| 2006/0031015 A1 * | 2/2006 | Paradie | 701/301 |
| 2006/0155469 A1 * | 7/2006 | Kawasaki | 701/301 |
| 2007/0024494 A1 * | 2/2007 | Dizaji et al. | 342/90 |
| 2007/0043502 A1 * | 2/2007 | Mudalige et al. | 701/207 |
| 2007/0182623 A1 * | 8/2007 | Zeng et al. | 342/174 |
| 2008/0172156 A1 * | 7/2008 | Joh et al. | 701/45 |
| 2010/0063685 A1 * | 3/2010 | Bullinger | 701/45 |
| 2010/0106418 A1 * | 4/2010 | Kindo et al. | 701/300 |
| 2010/0156699 A1 * | 6/2010 | Kuoch | 342/70 |
| 2011/0102242 A1 * | 5/2011 | Takeya et al. | 342/105 |
| 2011/0285574 A1 * | 11/2011 | Tsunekawa | 342/70 |

FOREIGN PATENT DOCUMENTS

| | | |
|---|---|---|
| JP | 9 178848 | 7/1997 |
| JP | 11 167699 | 6/1999 |
| JP | 2000 38121 | 2/2000 |
| JP | 2001 80437 | 3/2001 |
| JP | 2004 220233 | 8/2004 |
| JP | 2005 300259 | 10/2005 |

* cited by examiner

RADAR SYSTEM

TECHNICAL FIELD

The present invention relates to a radar system, and, more particularly, to a radar system which infers a track of an object.

BACKGROUND ART

Conventionally, a radar apparatus which detects an obstacle around a vehicle and calculates a track of movement of the obstacle relative to the vehicle, and a system which controls the vehicle on the basis of information of the track, have been developed.

For example, Patent Literature 1 discloses one example of the radar apparatus as described above. An obstacle recognition apparatus for a vehicle, which is disclosed in Patent Literature 1, irradiates the vicinity of the vehicle with a transmission wave such as laser light and receives a reflected wave of the transmission wave from an object, thereby detecting the object. Next, the obstacle recognition apparatus for the vehicle recognizes the detected object around the vehicle by a set of multiple points. Then, the obstacle recognition apparatus for the vehicle recognizes adjacent points out of the multiple points, as one segment. Then, the obstacle recognition apparatus for the vehicle recognizes the segment as a line segment having only a length in a width direction of the vehicle. In other words, the obstacle recognition apparatus for the vehicle recognizes the detected object as the line segment corresponding to the length of the object in a width direction of the object.

Here, the obstacle recognition apparatus for the vehicle, which is disclosed Patent Literature 1, can track the detected object. The obstacle recognition apparatus for the vehicle respectively compares the length and the position of a previously detected line segment to the length and the position of a currently detected line segment. Then, when the difference between the length of the previously detected line segment and the length of the currently detected line segment is within a predetermined range and the distance between the position of the previously detected line segment and the position of the currently detected line segment is within a predetermined range, the obstacle recognition apparatus for the vehicle determines that the previously detected object is identical to the currently detected object. By detecting the position of the object at each time in such processing, the obstacle recognition apparatus for the vehicle can track the detected object.

In a driving support system for a vehicle, which has been developed recently, a track obtained by tracking an object detected by a radar apparatus is calculated. Then, the driving support system infers a risk of collision of the vehicle with the object on the basis of the track and the like. In addition, the driving support system performs vehicle control in accordance with a result of the inference concerning the risk of collision. For example, when there is a risk of collision of the vehicle with the object, the driving support system performs a process of outputting an alarm which notifies a driver of the risk, or the like.

[Patent Literature 1] Japanese Laid-Open Patent Publication No. H7-318652

DISCLOSURE OF THE INVENTION

Problems to be Solved by the Invention

Meanwhile, when the radar apparatus as described above is mounted in a vehicle, and, for example, a detection target vehicle traveling in the vicinity of the vehicle is detected, a road-side object such as a guardrail may be erroneously recognized as an object identical to the vehicle in the vicinity of the vehicle. In other words, the detection target vehicle may be erroneously detected as being present at the position where the guardrail is present.

For example, when a transmission wave is perpendicularly applied to the front or a side of a detection target vehicle, the intensity of a reflected wave becomes relatively great. On the other hand, when a transmission wave is applied to a corner of the vehicle in an oblique direction relative to the traveling direction of the detection target vehicle, the intensity of a reflected wave becomes relatively small. Thus, when the detection target vehicle is moving, the position to which the transmission wave is applied shifts in response to the movement of the detection target vehicle, and hence the intensity of the reflected wave from the detection target changes. Here, when the intensity of a reflected wave from the detection target vehicle is smaller than the reflection intensity of a reflected wave from a road-side object such as a guardrail, the detection target vehicle may be erroneously detected as being present at the position where the guardrail is present, as described above.

When the driving support system as described above calculates a track of the detection target vehicle on the basis of position information which is erroneously detected thus, the track is inaccurately calculated. For example, when the detection target vehicle comes from the opposite direction and passes the own vehicle, the position to which the transmission wave is applied shifts in response to the movement of the detection target vehicle. Thus, the intensity of the reflection wave temporarily becomes small, and the position of the detection target vehicle is temporarily and erroneously detected. In other words, a phenomenon occurs that the position of the detection target vehicle detected by the radar apparatus shifts once from the actual position of the detection target vehicle to the position of the guardrail and returns again to the actual position of the detection target vehicle. When such erroneous detection of position information occurs, the driving support system calculates a track of the detection target vehicle actually traveling straight, as a meandering track.

In addition, when the calculated track of the detection target vehicle is inaccurate, there is the possibility that the driving support system will not be able to accurately determine a risk of collision of the own vehicle with the detection target vehicle. Further, in such a case, there is the possibility that the driving support system will perform inappropriate vehicle control on the basis of an erroneous result of determination concerning the risk of collision. For example, at an unnecessary timing, the driving support system may perform a process of outputting an alarm which notifies the driver of the risk, or the like. When the alarm, which notifies the driver of the risk of collision, is outputted at the unnecessary timing, the driver is made to feel annoyed.

Due to the above problems, a radar apparatus is desired which can determine whether or not a calculated track of an object is accurate.

Meanwhile, when erroneous detection occurs as described above, or when the detection target shifts from the road-side object to the detection target vehicle, it is thought that a moving speed of the detection target which is calculated on the basis of position information obtained form the radar apparatus is higher than the actual speed of the detection target. Such a phenomenon occurs because the above position information used for calculating a track is different from the actual position of the detection target vehicle.

For example, when a track of the detection target vehicle is calculated as a meandering track, the traveling distance of the detection target vehicle which is calculated on the basis of the track is longer than the actual traveling distance of the detection target. Thus, the moving speed which indicates a traveling distance per unit time is calculated as being higher than the actual speed.

Therefore, the moving speed obtained by using the above position information is different from the actual speed, and the possibility of the moving speed being inaccurate is high. As a result, it is difficult to determine whether or not the track is accurate, on the basis of the moving speed obtained by using the above position information.

The present invention is made in view of the above problems, and an object of the present invention is to provide a radar system which can calculate a track of an object and determine whether or not the track is accurate.

Solution to the Problems

To achieve the above objects, the present invention has the following aspects. Specifically, a first aspect of the present invention is directed to a radar system comprising: a radar section for emitting an electromagnetic wave to an object and receiving a reflected wave reflected from the object to detect position information of the object; a track calculation section for calculating, periodically at a first cycle, a track along which the object moves, on the basis of the position information obtained from the radar section; a first speed calculation section for calculating a first speed at which the object moves, on the basis of pieces of the position information at two different time points having a time interval which is longer than the first cycle; and a track determination section for determining whether or not the track is accurate, on the basis of at least the first speed.

In a second aspect based on the first aspect, the track determination section determines that the track is not accurately calculated, when the first speed is lower than a predetermined threshold.

In a third aspect based on the first aspect, the radar system further comprises a second speed calculation section for calculating a second speed at which the object moves, on the basis of two adjacent pieces of the position information which are obtained at the first cycle, and the track determination section determines whether or not the track is accurately calculated, on the basis of the first speed and the second speed.

In a fourth aspect based on the third aspect, the track determination section: calculates a difference value between the first speed and the second speed; determines that the track is accurately calculated, when the difference value is lower than a predetermined threshold; and determines that the track is not accurately calculated, when the difference value is equal to or higher than the predetermined threshold.

In a fifth aspect based on the third aspect, the track determination section: calculates a division value by dividing the second speed by the first speed; determines that the track is accurately calculated, when the division value is lower than a predetermined threshold; and determines that the track is not accurately calculated, when the division value is equal to or higher than the predetermined threshold.

In a sixth aspect based on the first aspect, the radar system is mounted in a vehicle, the radar system further comprises a predicted collision time calculation section for calculating a predicted collision time to collision of the object with the vehicle, and only when the predicted collision time satisfies a predetermined condition, the track determination section performs the determination concerning the track.

In a seventh aspect based on the sixth aspect, the track determination section performs the determination concerning the track when the predicted collision time is longer than a predetermined lower limit time, and does not perform the determination concerning the track when the predicted collision time is equal to or shorter than the lower limit time.

In an eighth aspect based on the sixth aspect, the track determination section performs the determination concerning the track when the predicted collision time is shorter than a predetermined upper limit time, and does not perform the determination concerning the track when the predicted collision time is equal to or longer than the upper limit time.

In a ninth aspect based on the eighth aspect, the track determination section performs the determination concerning the track when the predicted collision time is shorter than the upper limit time and longer than a lower limit time which is previously set so as to be shorter than the upper limit time, and does not perform the determination concerning the track when the predicted collision time is equal to or shorter than the lower limit time or when the predicted collision time is equal to or longer than the upper limit time.

In a tenth aspect based on the eighth aspect, the first speed calculation section calculates the first speed on the basis of: a piece of the position information of the object at a current time; and a piece of the position information of the object at a time point when the predicted collision time becomes shorter than the upper limit time.

In an eleventh aspect based on the first aspect, the radar system is mounted in a vehicle, the radar section further detects a distance from the vehicle to the object, as the position information, and only when the distance satisfies a predetermined condition, the track determination section performs the determination concerning the track.

In a twelfth aspect based on the eleventh aspect, the track determination section performs the determination concerning the track when the distance is longer than a predetermined lower limit distance, and does not perform the determination concerning the track when the distance is equal to or shorter than the lower limit distance.

In a thirteenth aspect based on the eleventh aspect, the track determination section performs the determination concerning the track when the distance is shorter than a predetermined upper limit distance, and does not perform the determination concerning the track when the distance is equal to or longer than the upper limit distance.

In a fourteenth aspect based on the thirteenth aspect, the track determination section performs the determination concerning the track when the distance is shorter than the upper limit distance and longer than a lower limit distance which is previously set so as to be shorter than the upper limit distance, and does not perform the determination concerning the track when the distance is equal to or shorter than the lower limit distance or when the distance is equal to or longer than the upper limit distance.

In a fifteenth aspect based on the thirteenth aspect, the first speed calculation section calculates the first speed on the basis of: a piece of the position information of the object at a current time; and a piece of the position information of the object at a time point when the distance becomes the upper limit distance.

In a sixteenth aspect based on the first aspect, the first speed calculation section calculates the first speed on the basis of: a piece of the position information of the object at a current time; and a piece of the position information of the object at a time point when the object becomes detectable by the radar section.

In a seventeenth aspect based on the first aspect, the first speed calculation section calculates the first speed on the basis of: a piece of the position information of the object at a current time; and a piece of the position information of the object which is obtained at a time point which is a predetermined time before the current time.

In an eighteenth aspect based on the first aspect, the radar system further comprises a meandering determination section for determining whether or not the track calculated by the track calculation section is meandering, and only when the track is meandering, the track determination section determines whether or not the track is accurately calculated.

In a nineteenth aspect based on the first aspect, the radar system is mounted in a vehicle, and further comprises a collision determination section for determining whether or not a risk of collision of the vehicle with the object is high, by using at least a determination result of the track determination section.

In a twentieth aspect based on the nineteenth aspect, the radar system further comprises a predicted collision time calculation section for calculating a predicted collision time to collision of the object with the vehicle, and the collision determination section includes: a time determination section for determining whether or not the predicted collision time is shorter than a collision determination value; and a count section for cumulatively adding an added value each time it is determined that the predicted collision time is shorter than the collision determination value. The count section: adds a first value as the added value each time the track determination section determines that the track is accurate; and adds, as the added value, a second value lower than the first value, each time the track determination section determines that the track is not accurate. When a cumulative value of the added value in the count section is equal to or higher than a predetermined threshold, the collision determination section determines that the risk of collision of the vehicle with the object is high.

In a twenty-first aspect based on the nineteenth aspect, the collision determination section determines whether or not the risk of collision of the vehicle with the object is high, on the basis of: the determination result of the track determination section; and the track calculated by the track calculation section.

In a twenty-second aspect based on the twenty-first aspect, the collision determination section includes: a detected object traveling direction calculation section for calculating a traveling direction of the object on the basis of the track; an own vehicle traveling direction calculation section for calculating a traveling direction of the vehicle; and an intersection determination section for determining whether or not the traveling direction of the object intersects the traveling direction of the vehicle. When the traveling direction of the object intersects the traveling direction of the vehicle and the track is accurate, the collision determination section makes it easy to determine that the risk of collision of the vehicle with the object is high.

Advantageous Effects of the Invention

According to the first aspect of the present invention, the first speed of the object detected by the radar section is calculated on the basis of the position information which is obtained at the long time interval as compared to a speed calculated at the first cycle. Thus, when a moving distance of the object which is detected by obtaining erroneous position information includes an error, the first speed is less influenced by the error than the speed calculated at the first cycle. In other words, the first speed can relatively accurately indicate the speed of the object. Therefore, according to the first aspect, the first speed at which the object moves can be used as a parameter for determining whether or not the track of the detected object is accurate. By using the first speed in the track determination, it can be accurately determined whether the track is accurate or inaccurate.

According to the second aspect of the present invention, it can be determined, by a simple process, whether or not the track of the object, which is a detection target, is accurate. When the moving speed of the object, which is the detection target, is low, it is thought that another object (e.g., a road-side object) close to the object, which is the detection target, is erroneously detected as the object. Thus, when the speed of the object, which is the detection target, is within a moving speed range in which the above erroneous detection is likely to occur, it is possible to determine that the track of the object is inaccurate. According to the second aspect, since it can be determined, by a simple process, whether or not the object, which is the detection target, is within the moving speed range, accuracy of the track of the object can be determined by a simple process.

According to the third aspect of the present invention, it can be determined whether or not the track of the object detected by the radar section is accurate, on the basis of the first and second speeds whose calculation cycles are different from each other. For example, the speed difference between the first speed and the second speed when erroneous detection of, as the object which is the detection target, another object close to the object occurs is greater than the speed difference between the first speed and the second speed when the erroneous detection does not occur. Thus, by comparing the magnitudes of the second speed and the first speed to each other, it can be determined whether or not the above erroneous detection has occurred, namely, whether or not the track is accurate.

According to the fourth aspect of the present invention, it can be determined whether or not the track is accurate, by a simple calculation process of obtaining the difference between the first speed and the second speed.

According to the fifth aspect of the present invention, it can be determined whether or not the track is accurate, by a simple calculation process of dividing the second speed by the first speed.

According to the sixth aspect of the present invention, while the predicted collision time of the object detected by the radar section does not satisfy the condition, the process of determining whether or not the track of the object is accurate is stopped, and the processing load can be reduced.

According to the seventh aspect of the present invention, when the predicted collision time of the object detected by the radar section is shorter than the lower limit time, the process of determining the accuracy of the track is omitted, and the processing load can be reduced. In addition, when the predicted collision time of the object detected by the radar section is shorter than the lower limit time, it is thought that the object is close to the vehicle. In such a situation, it is unlikely to simultaneously detect the object, which is the detection target, and another object by the radar section. Thus, erroneous detection of the other object as the object, which is the detection target, is unlikely to occur, and the track of the object, which is the detection target, is accurately calculated. Therefore, when the predicted collision time is shorter than the lower limit time, the process of determining the accuracy of the track of the object which is the detection target is omitted, and the processing can be sped up.

According to the eighth aspect of the present invention, when the predicted collision time of the object detected by the radar section is longer than the upper limit time, the process of determining the accuracy of the track is omitted, and the processing load can be reduced. In addition, when the predicted collision time of the object detected by the radar section is longer than the upper limit time, it is thought that the object is distant from the vehicle. In such a case, a need for determining collision of the object detected by the radar section with the vehicle having the radar system mounted therein is low, and a need for calculating the track of the object is also low. Therefore, when the predicted collision time is longer than the upper limit time, the process of determining the accuracy of the track is omitted, and the processing load can be reduced.

According to the ninth aspect of the present invention, the effects of the seventh aspect and the eighth aspect can be simultaneously obtained. In other words, according to the ninth aspect, the processing can be sped up and the processing load can be reduced.

According to the tenth aspect of the present invention, as data used for calculating the first speed, the radar system only necessarily stores the piece of the position information of the object at the time point when the predicted collision time becomes shorter than the predetermined upper limit time, and does not need to store pieces of the position information of the object at other time points. Thus, the storage area required for the radar system can be small. In addition, the determination concerning the track can be performed in processing after the time point when the predicted collision time becomes shorter than the predetermined upper limit time.

According to the eleventh aspect of the present invention, while the distance from the vehicle to the object detected by the radar section does not satisfy the condition, the process of determining whether or not the track of the object is accurate is stopped, and the processing load can be reduced.

According to the twelfth aspect of the present invention, when the distance from the vehicle to the object detected by the radar section is shorter than the lower limit distance, the process of determining the accuracy of the track of the object is omitted, and the processing load can be reduced. In addition, when the distance from the vehicle to the object detected by the radar section is shorter than the lower limit distance, it is thought that the object is close to the vehicle. In such a situation, it is unlikely to simultaneously detect the object, which is the detection target, and another object close to the object by the radar section. Thus, erroneous detection of the other object as the object, which is the detection target, is unlikely to occur, and the track of the object, which is the detection target, is accurately calculated. Therefore, when the distance from the vehicle to the object detected by the radar section is shorter than the lower limit distance, the process of determining the accuracy of the track of the object which is the detection target is omitted, and the processing can be sped up.

According to the thirteenth aspect of the present invention, when the distance from the vehicle to the object detected by the radar section is longer than the upper limit distance, the process of determining the accuracy of the track of the object is omitted, and the processing load can be reduced. In addition, when the distance from the vehicle to the object detected by the radar section is longer than the upper limit distance, it is thought that the object is distant from the radar section. In such a case, a need for determining collision of the object detected by the radar section with the vehicle having the radar system mounted therein is low, and a need for calculating the track of the object is also low. Thus, while the distance from the vehicle to the object detected by the radar section is longer than the upper limit distance, the process of determining the accuracy of the track of the object is omitted, and the processing load can be reduced. Further, the determination concerning the track can be performed in processing after the time point when the distance from the vehicle to the object detected by the radar section becomes shorter than the upper limit distance.

According to the fourteenth aspect of the present invention, the effects of the twelfth aspect and the thirteenth aspect can be simultaneously obtained. In other words, according to the fourteenth aspect, the processing can be sped up and the processing load can be reduced.

According to the fifteenth aspect of the present invention, as data used for calculating the first speed, the radar system only necessarily stores the piece of the position information of the object at the time point when the distance from the vehicle to the object detected by the radar section becomes shorter than the predetermined upper limit distance. In other words, the radar system does not need to store pieces of the position information of the object at time points other than the above time point. Thus, the storage area required for the radar system can be small. In addition, the determination concerning the track can be performed in processing after the time point when the distance from the vehicle to the object detected by the radar section becomes shorter than the predetermined upper limit distance.

According to the sixteenth aspect of the present invention, as data used for calculating the first speed, the radar system only necessarily stores the piece of the position information of the object at the time point when the object is detected by the radar section. In other words, the radar system does not need to store pieces of the position information of the object at time points other than the time point when the object is detected by the radar section. Thus, the storage area required for the radar system can be small. In addition, the determination concerning the track can be performed in processing after the time point when the object is detected by the radar section.

According to the seventeenth aspect of the present invention, it is unnecessary to store pieces of the position information of the object which are obtained by the radar section at time points prior to the time point which is the predetermined time before the current time. Thus, the storage area required for the radar system can be small.

According to the eighteenth aspect of the present invention, only when the track of the object detected by the radar section is meandering, it can be determined whether or not the track is accurate. Thus, when the track is not meandering, namely, when the possibility that the above erroneous detection has occurred is low, the determination as to whether or not the track is accurate is omitted, and the processing load can be reduced.

According to the nineteenth aspect of the present invention, the accuracy of the track of the object detected by the radar section is determined, and it can be determined, on the basis of the result of the determination, whether or not the risk of collision of the object with the vehicle is high.

According to the twentieth aspect of the present invention, when it is determined that the track of the object detected by the radar section is not accurate, it can be made to be difficult to determine that the risk of collision of the object with the vehicle is high, as compared to the case where it is determined that the track is accurate. Thus, when the risk of collision of the object with the vehicle is actually low, occurrence of erroneous determination that the risk of collision is high can be suppressed.

According to the twenty-first aspect and the twenty-second aspect of the present invention, the track of the object detected by the radar section is calculated, and it can be determined, on the basis of the track, whether or not the risk of collision of the object with the vehicle is high.

Figure 1:
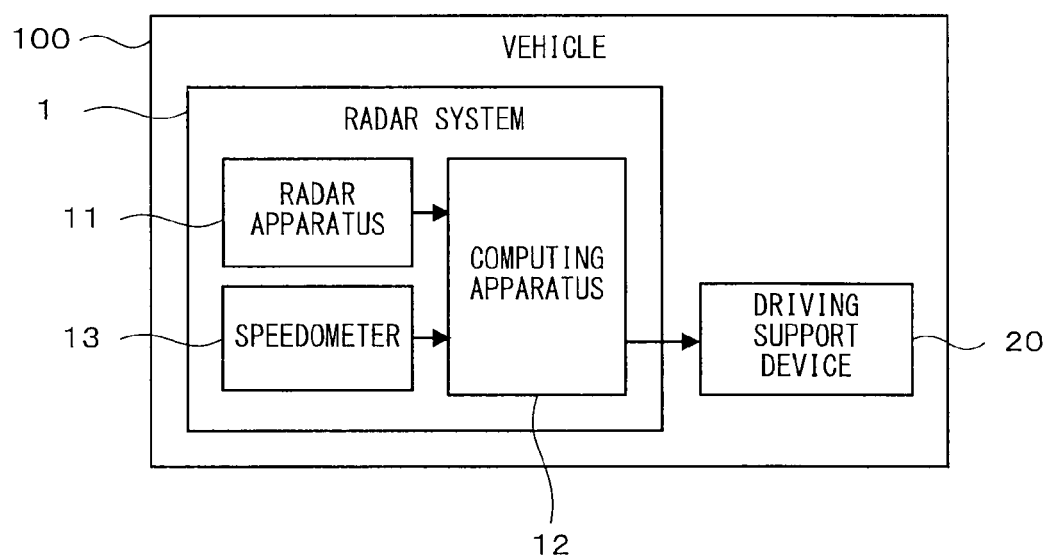
FIG. 1 is a block diagram illustrating a configuration of a radar system 1.

DESCRIPTION OF THE REFERENCE CHARACTERS 1 radar system
11 radar apparatus
12 computing apparatus
13 speedometer
20 driving support device
100 vehicle
200 detected vehicle
300 guardrail

BEST MODE FOR CARRYING OUT THE INVENTION

First Embodiment

The following will describe a radar system 1 according to a first embodiment of the present invention. The first embodiment will describe an example where the radar system 1 is mounted in a vehicle 100.

First, a configuration of the radar system 1 will be described with reference to FIG. 1. FIG. 1 is a block diagram illustrating the configuration of the radar system 1. As shown in FIG. 1, the vehicle 100 includes the radar system 1 and a driving support device 20. The radar system 1 includes a radar apparatus 11, a computing apparatus 12, and a speedometer 13. The radar apparatus 11 is electrically connected to the computing apparatus 12 and the speedometer 13. In addition, the computing apparatus 12 is electrically connected to the driving support device 20.

The radar apparatus 11 is a radar apparatus which irradiates an object with an irradiation wave such as an electromagnetic wave, receives a reflected wave from the object, and obtains information concerning the object. Hereinafter, an object detected by the radar apparatus 11 is referred to as a radar detected object. Specifically, the radar apparatus 11 detects a detected position P and a relative speed Vr of a radar detected object. The detected position P is relative position information of the radar detected object based on the vehicle 100. The relative speed Vr is a relative speed of the radar detected object relative to the vehicle 100. The radar apparatus 11 is provided at the front grille or the like of the vehicle 100, and detects an object present around the vehicle 100. The detected position P includes a relative distance Lr to the object and data indicating a direction to the object seen from the radar apparatus 11. When detecting an object, the radar apparatus 11 outputs, to the computing apparatus 12, data indicating a detected position P, a relative speed Vr, and a detection time T when the detected position P is detected.

Although a configuration in which the radar system 1 includes one radar apparatus 11 is described as an example in the first embodiment, the radar system 1 may include a plurality of radar apparatuses 11. For example, when the plurality of radar apparatuses 11 included in the radar system 1 are provided at the front, sides, and rear, respectively, of the vehicle 100, objects around the vehicle 100 can be detected in a wider range as compared to the case of including one radar apparatus 11.

The computing apparatus 12 is a computing apparatus which includes: an information processing device such as a CPU (Central Processing Unit); a storage device such as a memory; and an interface circuit. The computing apparatus 12 is typically an ECU (Electronic Control Unit) mounted in the vehicle 100. Although details of a process of the computing apparatus 12 will be described later, the computing apparatus 12 obtains data outputted periodically from the radar apparatus 11, and calculates a track of the radar detected object on the basis of the data. In addition, the computing apparatus 12 determines accuracy of the calculated track. Further, the computing apparatus 12 determines whether or not a risk of collision of the vehicle 100 with the radar detected object is high, on the basis of a result of the determination concerning the accuracy.

The speedometer 13 is a measuring device which measures a traveling speed Vm of the vehicle 100. The speedometer 13 outputs data indicating the measured traveling speed Vm, to the computing apparatus 12.

The driving support device 20 is typically a notifying device such as an alarm device. In response to a signal outputted from the computing apparatus 12, the driving support device 20 outputs an alarm which notifies a driver of the vehicle 100, of a risk of collision of the vehicle 100 with a radar detected object.

Figure 2:
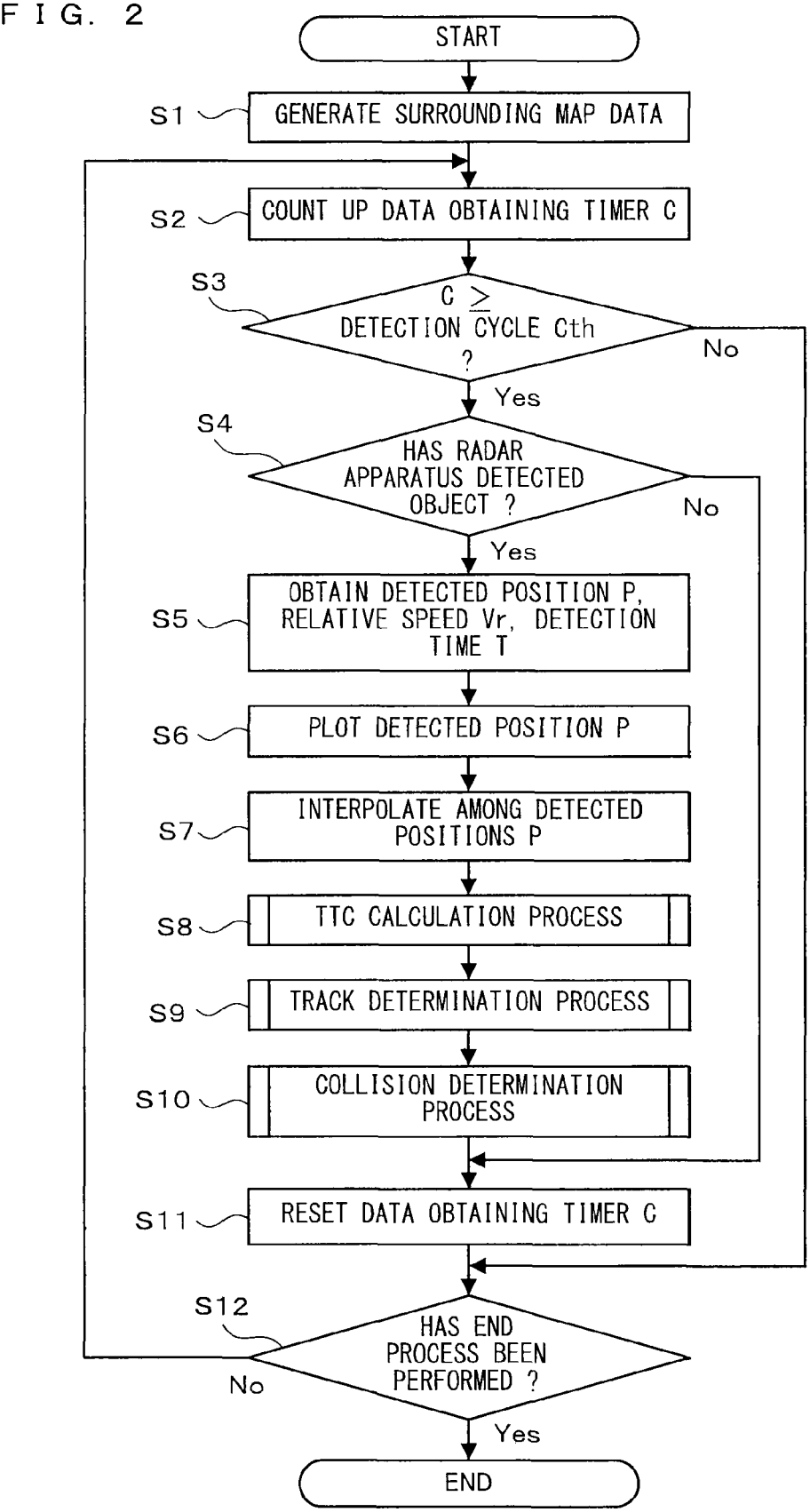
FIG. 2 is an example of a flowchart showing a process performed by a computing apparatus 12 according to a first embodiment.

Next, a process performed by the computing apparatus 12 will be described with reference to FIG. 2. FIG. 2 is an example of a flowchart showing the process performed by the computing apparatus 12. When an IG power supply of the vehicle 100 is turned on, the computing apparatus 12 starts the process in the flowchart shown in FIG. 2.

At step S1, the computing apparatus 12 generates surrounding map data. The surrounding map data is map data indicating the positional relationship between the radar detected object and the vehicle 100. Specifically, the computing apparatus 12 generates map data indicating an area within a predetermined distance from the vehicle 100, which area is centered on the vehicle 100. In a process at later-described step S6, the computing apparatus 12 calculates a track of the radar detected object by plotting the detected position P of the radar detected object on the surrounding map data. When the process at step S1 is completed, the computing apparatus 12 advances the processing to step S2.

Note that, although the example has been described where, at the above step S1, the computing apparatus 12 defines the map data by using a coordinate system which is centered on the vehicle 100, the computing apparatus 12 may define map data by using a coordinate system which is centered on another point, not by using the coordinate system which is centered on the vehicle 100.

At step S2, the computing apparatus 12 counts up a data obtaining timer C. The data obtaining timer C is a timer which measures a time interval at which the computing apparatus 12 obtains data outputted from the radar apparatus 11. The computing apparatus 12 stores a count value of the data obtaining timer C in the storage device. The computing apparatus 12 increases the count value of the data obtaining timer C, which is stored in the storage device, for example, by one, and stores the increased count value such that the original count value is overwritten with the increased count value. Note that the increased amount by which the computing apparatus 12 increases the count value may not be one. When the process at step S2 is completed, the computing apparatus 12 advances the processing to step S3.

At step S3, the computing apparatus 12 determines whether or not the count value of the data obtaining timer C is equal to or more than a detection cycle Cth. The detection cycle Cth is a constant value stored previously in the storage device of the computing apparatus 12. The computing apparatus 12 reads out the count value of the data obtaining timer C and the value of the detection cycle Cth from the storage device, and compares each value. When determining that the count value of the data obtaining timer C is equal to or more than the detection cycle Cth, the computing apparatus 12 advances the processing to step S4. On the other hand, when determining that the count value of the data obtaining timer C is less than the detection cycle Cth, the computing apparatus 12 advances the processing to step S12.

At step S4, the computing apparatus 12 determines whether or not the radar apparatus 11 has detected an object. Specifically, for example, the computing apparatus 12 determines whether or not data indicating a detected position P and a detection time T has been outputted from the radar apparatus 11. When the data indicating the detected position P and the detection time T has been outputted from the radar apparatus 11, the computing apparatus 12 determines that the radar apparatus 11 has detected the object, and advances the processing to step S5. On the other hand, when the data indicating the detected position P and the detection time T has not been outputted from the radar apparatus 11, the computing apparatus 12 determines that the radar apparatus 11 has not detected any object, advances the processing to step S11, and resets the value of the data obtaining timer C.

By repeating the processes at the above steps S2 to S4, the computing apparatus 12 obtains the detected position P of the radar detected object each time the detection cycle Cth elapses. Note that, the radar apparatus 11 may constantly detect an object and output information concerning the object to the computing apparatus 12 until the detection cycle Cth elapses, or the radar apparatus 11 may detect an object only at a timing when the detection cycle Cth elapses, and may output information concerning the object to the computing apparatus 12 only at this timing.

At step S5, the computing apparatus 12 obtains a detected position P, a relative speed Vr, and a detection time T. Specifically, the computing apparatus 12 receives data indicating the detected position P, the relative speed Vr, and the detection time T, from the radar apparatus 11, and stores the data in the storage device. Note that the radar apparatus 11 also similarly stores a relative distance Lr, which is included in the detected position P, in the storage device. When the process at step S5 is completed, the computing apparatus 12 advances the processing to step S6.

At step S6, the computing apparatus 12 plots the detected position P. Specifically, the computing apparatus 12 plots the detected position P obtained at the above step S4, on the surrounding map data created at the above step S1. When the process at step S6 is completed, the computing apparatus 12 advances the processing to step S7.

At step S7, the computing apparatus 12 interpolates among plotted points. Specifically, the computing apparatus 12 connects the points plotted on the surrounding map data by the process at step S6, by straight lines in chronological order, and sets the obtained line segment as a calculated track of the radar detected object. Note that the computing apparatus 12 may interpolate among the plotted points by curved lines. Further, in the case where only a group of the points plotted at the above step S6 is regarded as a track of the radar detected object, the process at step S7 may be omitted. When the process at step S7 is completed, the computing apparatus 12 advances the processing to step S8.

By the processes at the above steps S5 to S7 being repeated, each time the detection cycle Cth elapses, the detected position P at each detection time is plotted on the surrounding map data, and a track of the radar detected object is calculated on the basis of the plotted detected positions P.

Figure 3:
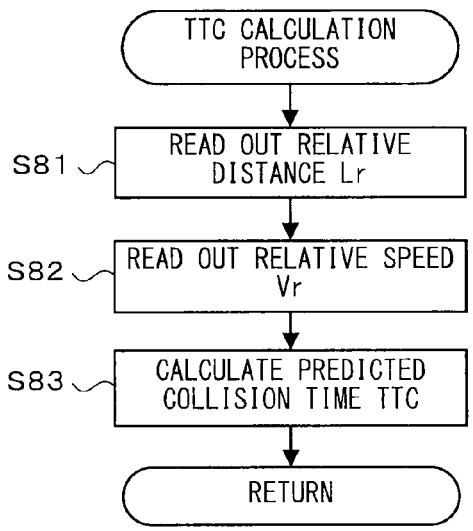
FIG. 3 is an example of a flowchart showing a TTC calculation process.

At step S8, the computing apparatus 12 performs a subroutine process of a TTC calculation process. The TTC calculation process is a process of calculating a predicted collision time TTC of the radar detected object. The predicted collision time TTC is a time which is predicted to be taken until the radar detected object collides with the vehicle 100. FIG. 3 is an example of a flowchart showing the subroutine process of the TTC calculation process. The following will describe the TTC calculation process with reference to FIG. 3.

At step S81, the computing apparatus 12 reads out the relative distance Lr. Specifically, the computing apparatus 12 reads out a value of the relative distance Lr included in the data of the detected position P which is stored in the process at the above step S5. When the process at step S81 is completed, the computing apparatus 12 advances the processing to step S82.

At step S82, the computing apparatus 12 reads out the relative speed Vr. Specifically, the computing apparatus 12 reads out a value of the relative speed Vr which is stored in the process at the above step S5. When the process at step S82 is completed, the computing apparatus 12 advances the processing to step S83.

At step S83, the computing apparatus 12 calculates a predicted collision time TTC. Specifically, the computing apparatus 12 calculates the predicted collision time TTC on the basis of the following equation (1), and stores a value of the predicted collision time TTC in the storage device.

$$TTC = Lr/Vr \quad (1)$$

The calculated predicted collision time TTC is used in a collision determination process at later-described step S10. When the process at step S83 is completed, the computing apparatus 12 ends the subroutine of the TTC calculation process and advances the processing to step S9 shown in FIG. 2.

Note that the above has described an example where the radar apparatus 11 obtains the relative speed Vr, but the computing apparatus 12 may calculate the relative speed Vr on the basis of the detected position P.

Figure 4:
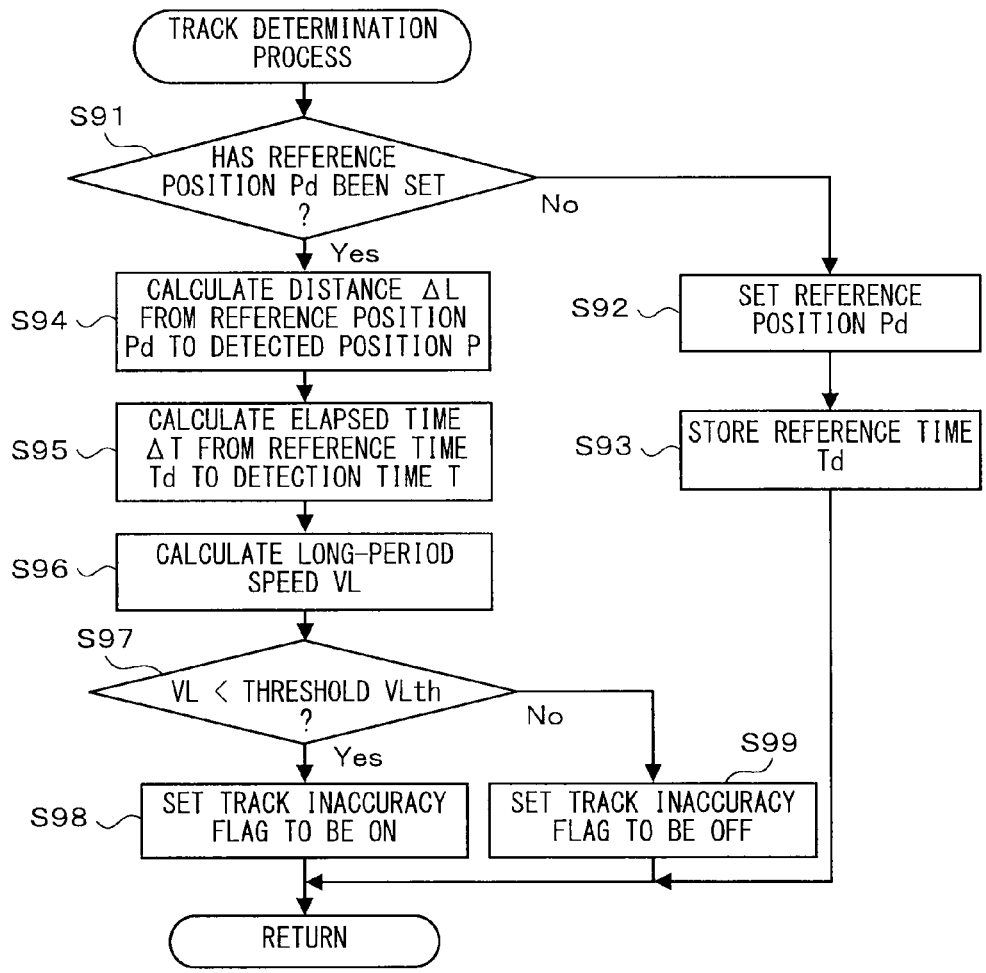
FIG. 4 is an example of a flowchart showing a track determination process according to the first embodiment.

At step S9, the computing apparatus 12 performs a track determination process. The track determination process is a process of determining accuracy of the calculated track of the radar detected object which is calculated in the above processing. Specifically, the computing apparatus 12 performs a subroutine process of the track determination process which is shown in FIG. 4. Note that FIG. 4 is an example of a flowchart showing the track determination process according to the first embodiment. The following will describe the track determination process with reference to FIG. 4.

At step S91, the computing apparatus 12 determines whether or not a reference position Pd has been set. The reference position Pd is data of a detected position P which is used as a reference when the speed of the radar detected object is calculated. The reference position Pd is set at later-described step S92. At step S91, specifically, the computing apparatus 12 refers to an address at which a value of the reference position Pd of the radar detected object is stored in the storage device, and determines whether or not the value of the reference position Pd is a predetermined initial value. When the value of the reference position Pd is a value other than the initial value, the computing apparatus 12 determines that the reference position Pd has been set, and advances the processing to step S94. On the other hand, when the value of the reference position Pd is the initial value, the computing apparatus 12 determines that the reference position Pd has not been set, and advances the processing to step S92.

For a newly detected radar detected object, the reference position Pd is not set. Thus, the process at step S91 can be said to be a process of determining whether or not the radar detected object is a newly detected object. The example has been described where, at the above step S91, the computing apparatus 12 determines whether or not the radar detected object is a newly detected object, on the basis of whether or not the reference position Pd has been set. However, the computing apparatus 12 may determine whether or not the radar detected object is a newly detected object, by using any conventionally known method.

For example, when the radar apparatus 11 itself is capable of determining whether or not the radar detected object is a newly detected object, the computing apparatus 12 may determine whether or not the radar detected object is a newly detected object, on the basis of a result of the determination. Specifically, when detecting an object, the radar apparatus 11 determines whether or not the object is a newly detected object. Then, when the radar detected object is a newly detected object, the radar apparatus 11 transmits, to the computing apparatus 12, flag data indicating that the radar detected object is a newly detected object. The computing apparatus 12 determines whether or not the radar detected object is a newly detected object, on the basis of the flag data from the radar apparatus 11.

At step S92, the computing apparatus 12 sets the reference position Pd. The computing apparatus 12 stores data of the latest detected position P, which is obtained at the above step S5, as the reference position Pd in the storage device. When the process at step S92 is completed, the computing apparatus 12 advances the processing to step S93.

At step S93, the computing apparatus 12 stores a reference time Td. The reference time Td is data of a detection time T which is used as a reference when the speed of the radar detected object is calculated. The computing apparatus 12 stores data of the latest detection time T, which is obtained at the above step S5, as the reference time Td in the storage device. When the process at step S93 is completed, the computing apparatus 12 completes the track determination process and returns the processing to step S10 in the flowchart of FIG. 2.

At step S94, the computing apparatus 12 calculates a distance $\Delta L$ from the reference position Pd to the detected position P. Specifically, the computing apparatus 12 calculates the distance between the latest detected position P obtained in the process at step S5 and the previously stored reference position Pd, as the distance $\Delta L$ which is the direct distance between these positions. When the process at step S94 is completed, the computing apparatus 12 advances the processing to step S95.

At step S95, the computing apparatus 12 calculates an elapsed time $\Delta T$ from the reference time Td to the detection time T. Specifically, the computing apparatus 12 calculates the interval between the latest detection time T obtained in the process at step S5 and the previously stored reference time Td, as the elapsed time $\Delta T$ from the reference time. The elapsed time $\Delta T$ calculated as described above is a value which is equal to or more than the detection cycle Cth and is an integral multiple of the detection cycle Cth. When the process at step S95 is completed, the computing apparatus 12 advances the processing to step S96.

Note that the example has been described where, in the process at the above step S95, the computing apparatus 12 calculates the elapsed time $\Delta T$ on the basis of the detection time T obtained from the radar apparatus 11, but the computing apparatus 12 may calculate the elapsed time $\Delta T$ by using another conventionally known method. For example, after the process at step S93, the computing apparatus 12 may perform a process of: performing addition to the timer value each time obtaining the detected position P; and using the timer value as a value of the elapsed time $\Delta T$. According to such a process, the computing apparatus 12 does not need to obtain the detection time T from another apparatus.

At step S96, the computing apparatus 12 calculates a long-period speed VL. The long-period speed VL is an absolute speed of the radar detected object which is calculated on the basis of the following equation (2). The computing apparatus 12 obtains a value of the traveling speed Vm from the speedometer 13, calculates the long-period speed VL on the basis of the following equation (2), and stores the long-period speed VL.

$$VL = \Delta L/\Delta T - Vm \quad (2)$$

When the process at step S96 is completed, the computing apparatus 12 advances the processing to step S97.

According to the processes at the above steps S91 to S96, the long-period speed VL of the radar detected object is calculated in accordance with at least the detected positions P which are obtained at a time interval which is equal to or more than the detection cycle Cth. Although details will be described later, the long-period speed VL is calculated on the basis of the detected positions P which are obtained at a time interval which is long to some extent. Thus, even when the detected position P is erroneously detected, it is unlikely to be influenced by the erroneous detection, and the speed of the radar detected object can be relatively accurately calculated.

At step S97, the computing apparatus 12 determines whether or not the long-period speed VL is lower than a threshold VLth. The threshold VLth is a constant value which is previously stored in the storage device. A value of the threshold VLth is previously set to be a value of, for example, 9 to 12 km/h. Note that, in the first embodiment, the computing apparatus 12 stores the value of the threshold VLth as 9.7 km/h. The computing apparatus 12 reads out the long-period speed VL and the threshold VLth from the storage device, and compares each value. When determining that the long-period speed VL is lower than the threshold VLth, the computing apparatus 12 advances the processing to step S98. On the other hand, when determining that the long-period speed VL is equal to or higher than the threshold VLth, the computing apparatus 12 advances the processing to step S99.

At step S98, the computing apparatus 12 sets a track inaccuracy flag to be ON. The track inaccuracy flag is a flag indicating whether or not the calculated track, which is calculated in the above processing, is accurate. When the state of the track inaccuracy flag is ON, the track inaccuracy flag indicates that the calculated track is inaccurate. When the state of the track inaccuracy flag is OFF, the track inaccuracy flag indicates that the calculated track is accurate. The computing apparatus 12 stores the state of the track inaccuracy flag in the storage device. Note that an initial state of the track inaccuracy flag is set to be OFF. At step S98, the computing apparatus 12 sets the state of the track inaccuracy flag to be ON, and stores the set state of the flag in the storage device such that the original state of the flag is overwritten with the set state of the flag. When the process at step S98 is updated, the computing apparatus 12 completes the track determination process and advances the processing to step S10 in the flowchart of FIG. 2.

At step S99, the computing apparatus 12 sets the track inaccuracy flag to be OFF. Specifically, the computing apparatus 12 sets the state of the track inaccuracy flag to be OFF, and stores the set state of the flag in the storage device such that the original state of the flag is overwritten with the set state of the flag. When the process at step S98 is completed, the computing apparatus 12 completes the track determination process and advances the processing to step S10 in the flowchart of FIG. 2.

According to the processes at the above steps S97 to S99, when the long-period speed VL of the radar detected object is lower than the threshold VLth, it is determined that the calculated track of the radar detected object is not accurate, and the track inaccuracy flag, which indicates the result of the determination, can be set to be ON. On the other hand, when the long-period speed VL of the radar detected object is equal to or higher than the threshold VLth, it is determined that the calculated track of the radar detected object is accurate, and the track inaccuracy flag is set to be OFF.

Originally, when the difference in speed between a radar detected object, which is a detection target, and an object such as a road-side object, which is present near the radar detected object, is small, the radar apparatus 11 is likely to mistake the object for the radar detected object and erroneously detect the object. In other words, in the situation where the speed of the radar detected object is low, the radar apparatus 11 is likely to erroneously detect the stationary road-side object, such as the guardrail, as the radar detected object. Then, in the situation where the above erroneous detection is likely to occur, it is thought that the track of the radar detected object is not accurate. Here, since the long-period speed VL, which indicates an accurate speed of the radar detected object, is calculated by the processes at the above steps S91 to S96, the computing apparatus 12 can determine whether or not the speed of the radar detected object is low, on the basis of the long-period speed VL. Therefore, in the processes at the above steps S97 to S99, the computing apparatus 12 can determine whether or not the track of the radar detected object is accurate, on the basis of the long-period speed VL of the radar detected object.

Figure 5:
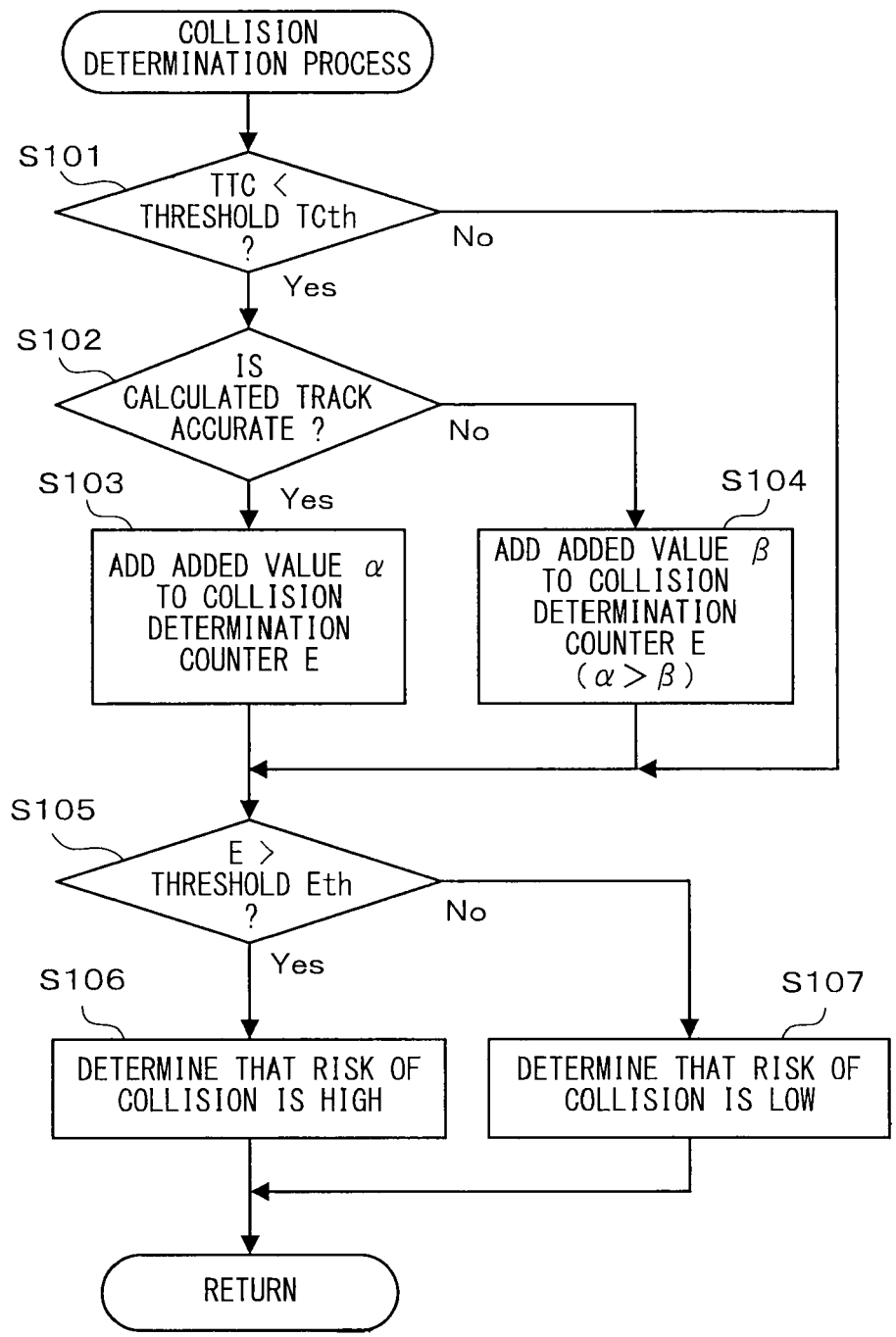
FIG. 5 is an example of a flowchart showing a collision determination process according to the first embodiment.

Back to the description of FIG. 2, at step S10, the computing apparatus 12 performs a subroutine process of the collision determination process. The collision determination process is a process of determining whether or not there is a possibility that the radar detected object will collide with the vehicle 100. FIG. 5 is an example of a flowchart showing the collision determination process according to the first embodiment. The following will describe the collision determination process with reference to FIG. 5.

At step S101, the computing apparatus 12 determines whether or not the predicted collision time TTC is less than a collision determination value TCth. The collision determination value TCth is an optional constant which is previously stored in the storage device of the computing apparatus 12. The computing apparatus 12 reads out the value of the predicted collision time TTC and the collision determination value TCth which are stored in the storage device, and compares each value. When determining that the predicted collision time TTC is less than the collision determination value TCth, the computing apparatus 12 advances the processing to step S102. On the other hand, when determining that the predicted collision time TTC is equal to or higher than the collision determination value TCth, the computing apparatus 12 advances the processing to step S105.

At step S102, the computing apparatus 12 determines whether or not the calculated track is accurate. Specifically, the computing apparatus 12 determines whether or not the track inaccuracy flag stored in the storage device is ON. When the track inaccuracy flag stored in the storage device is OFF, the computing apparatus 12 determines the calculated track is accurate, and advances the processing to step S103. On the other hand, when the track inaccuracy flag stored in the storage device is ON, the computing apparatus 12 determines that the calculated track is not accurate, and advances the processing to step S104.

At step S103, the computing apparatus 12 adds an added value α to a collision determination counter E. The collision determination counter E is a variable which is stored in the storage device of the computing apparatus 12. The added value α is a constant which is previously stored in the storage device of the computing apparatus 12. The computing apparatus 12 reads out a value of the collision determination counter E and the added value α from the storage device, adds the added value α to the collision determination counter E, and overwrites the value of the collision determination counter E with the value obtained by the addition, in the storage device. When the process at step S103 is completed, the computing apparatus 12 advances the processing to step S105.

At step S104, the computing apparatus 12 adds an added value β to the collision determination counter E. The added value β is a constant which is previously stored in the storage device of the computing apparatus 12. Note that the added value β is lower than the added value α. The computing apparatus 12 reads out the value of the collision determination counter E and the added value β from the storage device, adds the added value β to the collision determination counter E, and overwrites the value of the collision determination counter E with the value obtained by the addition, in the storage device. When the process at step S104 is completed, the computing apparatus 12 advances the processing to step S105.

According to the processes at the above steps S102 to S104, the magnitude of the added value to be added to the collision determination counter E can be changed in accordance with whether or not the calculated track is accurate. Specifically, when the calculated track is not accurate, the added value can be decreased, and when the calculated track is accurate, the added value can be increased. In addition, according to the processes at steps S101 to S104, when the predicted collision time TTC of the radar detected object is less than the collision determination value TCth, namely, when a risk of collision of the radar detected object with the vehicle 100 is high, the added value is added to the collision determination counter E.

At step S105, the computing apparatus 12 determines whether or not the value of the collision determination counter E is higher than a threshold Eth. The threshold Eth is a constant which is previously stored in the storage device of the computing apparatus 12. The computing apparatus 12 reads out the value of the collision determination counter E and a value of the threshold Eth which are stored in the storage device, and compares each value. When determining that the value of the collision determination counter E is higher than the threshold Eth, the computing apparatus 12 advances the processing to step S106. On the other hand, when determining that the value of the collision determination counter E is equal to or lower than the threshold Eth, the computing apparatus 12 advances the processing to step S107.

At step S106, the computing apparatus 12 determines that a risk of collision of the vehicle 100 with the radar detected object is high. Specifically, the computing apparatus 12 outputs, to the driving support device 20, an instruction signal to output an alarm. The driving support device 20 having received the instruction signal outputs an alarm. When the process at step S106 is completed, the computing apparatus 12 ends the subroutine process of the collision determination process and advances the processing to step S11 in FIG. 2.

At step S107, the computing apparatus 12 determines that the risk of collision of the vehicle 100 with the radar detected object is low. Specifically, the computing apparatus 12 outputs, to the driving support device 20, an instruction signal to stop an alarm. The driving support device 20 having received the instruction signal stops an alarm. When being in a state where an alarm has been stopped, the driving support device 20 maintains the state where the alarm has been stopped. When the process at step S107 is completed, the computing apparatus 12 ends the subroutine process of the collision determination process and advances the processing to step S11 in FIG. 2.

According to the processes at the above steps S105 to S107, when the value of the collision determination counter E is higher than the threshold Eth, the computing apparatus 12 determines that the risk of collision of the radar detected object with the vehicle 100 is high, and until the value of the collision determination counter E exceeds the threshold Eth, the computing apparatus 12 determines that the risk of collision of the radar detected object with the vehicle 100 is low. Here, as described above, since the added value to be added to the collision determination counter E is decreased when the calculated track is not accurate, it is difficult to greatly increase the value of the collision determination counter E. Thus, when the calculated track is not accurate, it is difficult to determine that the risk of the radar detected object with the vehicle 100 is high, as compared to the case where the calculated track is accurate. As described above, when obtained information of the radar detected object is inaccurate, the process is performed, which makes it difficult to determine that the risk of collision of the radar detected object with the vehicle 100 is high. Thus, unnecessary output of an alarm by the driving support device 20 is suppressed, and the driver is prevented from feeling annoyed.

Note that the above has described the example where the computing apparatus 12 determines whether or not the risk of collision of the vehicle 100 with the radar detected object is high, on the basis of parameters such as the track inaccuracy flag and the predicted collision time TTC, but the computing apparatus 12 may determine whether or not the risk of collision of the vehicle 100 with the radar detected object is high, by using another parameter in addition to the parameters such as the track inaccuracy flag.

Back to the description of FIG. 2, at step S11, the computing apparatus 12 resets the data obtaining timer C. Specifically, the computing apparatus 12 resets the count value of the data obtaining timer C, which is stored in the storage device, to an initial value. When the process at step S11 is completed, the computing apparatus 12 advances the processing to step S12.

At step S12, the computing apparatus 12 determines whether or not an end process has been performed. Specifically, the computing apparatus 12 determines whether or not the end process of ending the operation of the radar system 1, such as the IG power supply of the vehicle 100 being turned off, has been performed by the user. When detecting the end process performed by the user and determining that the end process has been performed, the computing apparatus 12 ends the process of the flowchart shown in FIG. 2. On the other hand, when not detecting the end process performed by the user and determining that the end process has not been performed, the computing apparatus 12 returns the processing to step S2.

According to the process at the above step S12, until the end process is performed by the user, the processes at steps S2 to S11 are repeated.

Next, the situation will be described where, on the basis of the above processing, the radar system 1 calculates a track of the radar detected object and determines the calculated track.

Hereinafter, the situation will be described where the radar system 1 mounted in the vehicle 100 calculates a track of a detected vehicle 200, which is traveling straight on the right lane of the vehicle 100 and coming from the opposite direction, and determines the calculated track.

Figure 6:
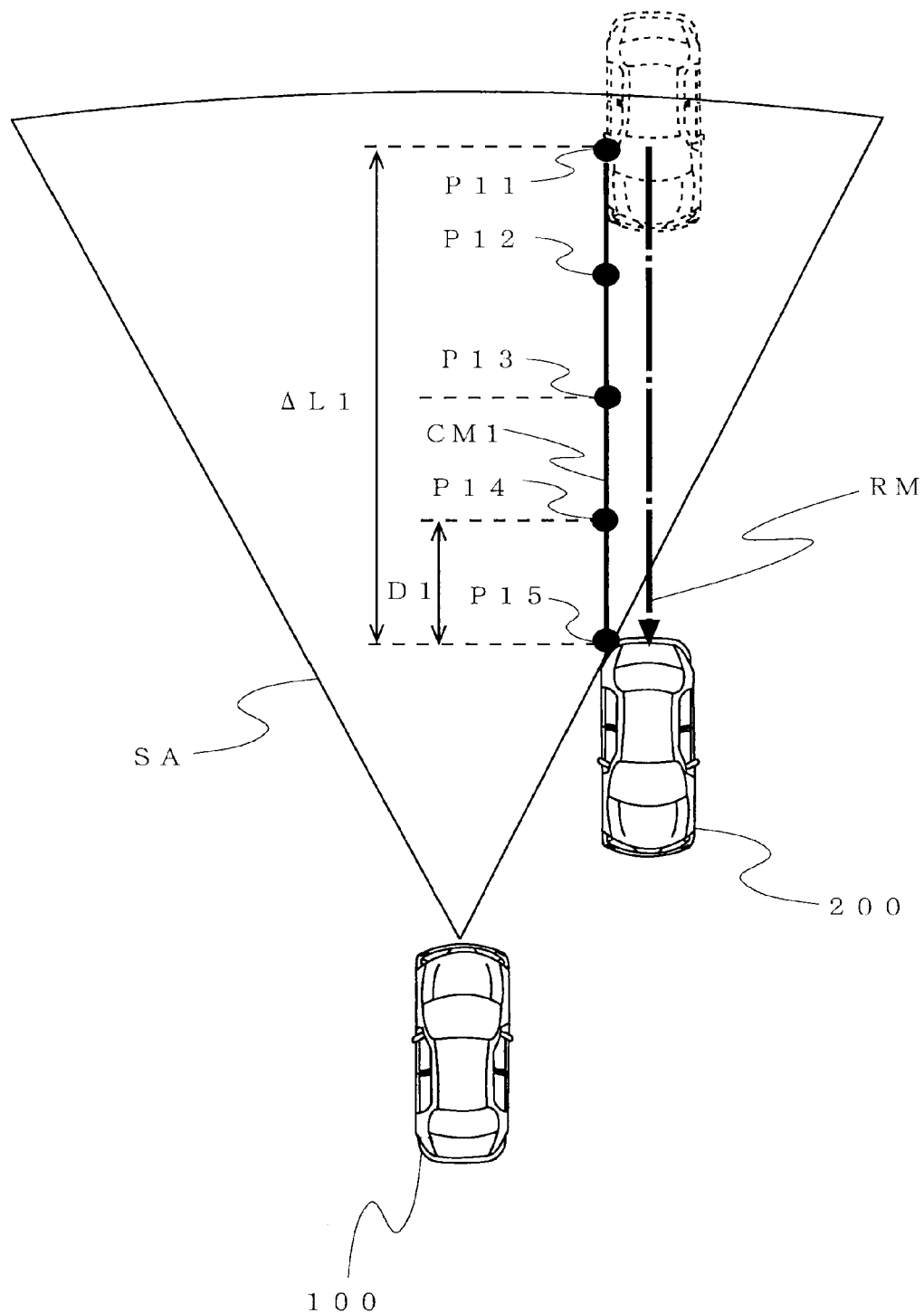
FIG. 6 is a conceptual diagram illustrating a calculated track CM1 of a detected vehicle 200 which is calculated when the position of the detected vehicle 200 is accurately detected.

First, a track of the detected vehicle 200, which is calculated by the computing apparatus 12 when erroneous detection or the like does not occur and the radar apparatus 11 accurately detects a detected position P, will be described with reference to FIG. 6. FIG. 6 is a conceptual diagram illustrating a calculated track CM1 of the detected vehicle 200 which is calculated when the detected position P of the detected vehicle 200 is accurately detected. In FIG. 6, the actual track (hereinafter, referred to as real track RM) of the detected vehicle 200 is indicated by a chain line. Since the detected vehicle 200 is actually traveling straight, the real track RM is also straight.

In FIG. 6, the radar apparatus 11 detects, as a radar detected object, an object which is present within a detection area SA. In the following example, the radar apparatus 11 obtains information concerning the detected vehicle 200 within the detection area SA, and outputs the information to the computing apparatus 12.

On the basis of the processes at the above steps S1 to S6, the computing apparatus 12 plots, on the surrounding map data, a detected position P11, a detected position P12, a detected position P13, a detected position P14, and a detected position P15 at a detection time T11, a detection time T12, a detection time T13, a detection time T14, and a detection time T15, respectively. Note that each of the detection time T11, the detection time T12, the detection time T13, the detection time T14, and the detection time T15 is data indicating a detection time T. The detection time T11, the detection time T12, the detection time T13, the detection time T14, and the detection time T15 indicate an earlier time to a recent time, respectively, in order. In addition, the detected position P11, the detected position P12, the detected position P13, the detected position P14, and the detected position P15 each indicate the detected position P plotted on the surrounding map data at each detection time, and correspond to the earlier detection time T to the recent detection time T.

On the basis of the above step S7, the computing apparatus 12 interpolates among the detected position P11, the detected position P12, the detected position P13, the detected position P14, and the detected position P15 by straight lines, and calculates the calculated track CM1 of the detected vehicle 200. When the detected position P is accurately detected, the calculated track CM1 is straight similarly to the real track RM as shown in FIG. 6.

Figure 7:
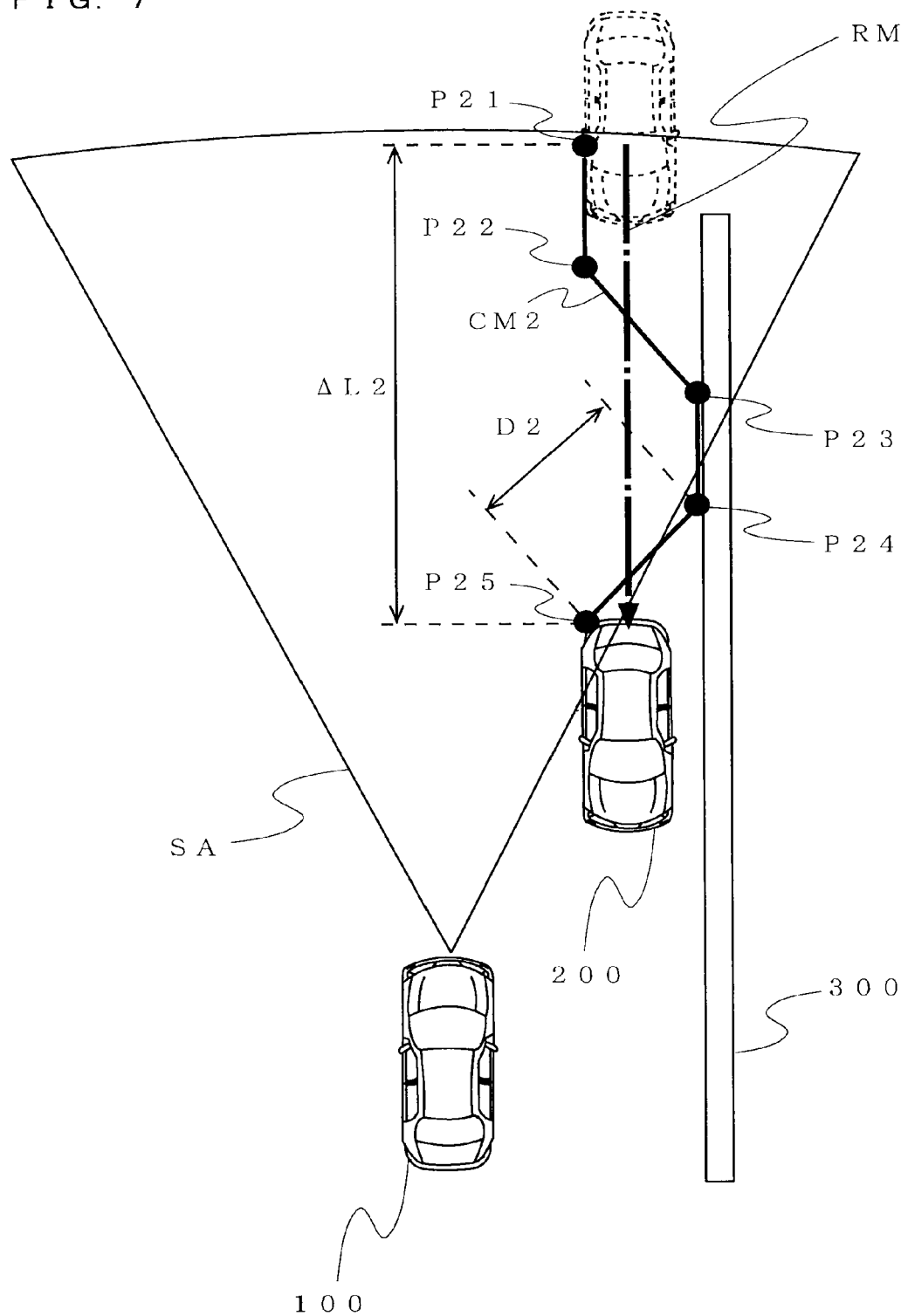
FIG. 7 is a conceptual diagram illustrating a calculated track CM2 of the detected vehicle 200 which is calculated when the position of the detected vehicle 200 is erroneously detected.

On the other hand, when the radar apparatus 11 erroneously detects the radar detected object and the detected position P is not accurately detected, the calculated track has a shape different from that of the real track RM. Hereinafter, a track of the detected vehicle 200, which is calculated by the computing apparatus 12 when the radar apparatus 11 erroneously detects the detected vehicle 200 and the detected position P cannot be accurately detected, will be described with reference to FIG. 7. FIG. 7 is a conceptual diagram illustrating a calculated track CM2 of the detected vehicle 200 which is calculated when the position of the detected vehicle 200 is erroneously detected.

In FIG. 7, the detected vehicle 200 is moving along the same track as in FIG. 6. In other words, the detected vehicle 200 is traveling straight on the right lane of the vehicle 100 and coming from the opposite direction. Thus, the real track RM of the detected vehicle 200 is straight. In FIG. 7, a detected position P21, a detected position P22, a detected position P23, a detected position P24, and a detected position P25 indicate the detected positions P which are detected at a detection time T21, a detection time T22, a detection time T23, a detection time T24, and a detection time T25, respectively, and which are plotted on the surrounding map data. Note that each of the detection time T21, the detection time T22, the detection time T23, the detection time T24, and the detection time T25 is data indicating a detection time T. The detection time T21, the detection time T22, the detection time T23, the detection time T24, and the detection time T25 indicate an earlier time to a recent time, respectively, in order. The calculated track CM2 is a calculated track of the detected vehicle 200 which is calculated by interpolating among the detected position P21, the detected position P22, the detected position P23, the detected position P24, and the detected position P25 by using straight lines.

In FIG. 7, a guardrail 300 is present on the right side of the traveling direction of the detected vehicle 200. Here, the radar apparatus 11 erroneously detects the guardrail 300 as being regarded as the detected vehicle 200, at the detection time T23 and the detection time T24. Due to the erroneous detection, the detected position P23 and the detected position P24 indicate positions shifted toward the guardrail 300 from the detected position P13 and the detected position P14 in FIG. 6, which indicate the actual positions of the detected vehicle 200. Note that, at the detection time T21, the detection time T22, and the detection time T25, the radar apparatus 11 accurately detects the detected position P21, the detected position P22, and the detected position P25. The detected position P21, the detected position P22, and the detected position P25, which are shown in FIG. 7, indicate the same positions as the detected position P11, the detected position P12, and the detected position P15, respectively, which are shown in FIG. 6. Thus, the calculated track CM2 shown in FIG. 7 has a shape which is bent at the detected position P23 and the detected position P24, and is an inaccurate meandering track, even thought the detected vehicle 200 is actually traveling straight.

The above erroneous detection is likely to occur when the difference in speed between a radar detected object, which is a calculation target of a track, and another radar detected object is small. In the above example, the above erroneous detection is likely to occur when the difference in speed between the detected vehicle 200 and the road-side object such as the guardrail 300 is small. Here, since the guardrail 300 remains stationary, it can be inferred that the lower the absolute speed of the radar detected object is, the lower the accuracy of the calculated track of the radar detected object, which is calculated by the radar system 1, becomes. However, when the speed of the radar detected object is calculated on the basis of the position information obtained at a time interval which is equal to the detection cycle Cth, the speed may be calculated so as to be higher than the actual moving speed of the radar detected object due to the influence of the above erroneous detection. Hereinafter, the absolute speed of the radar detected object which is calculated on the basis of position information which is sampled at a time interval equal to the detection cycle Cth is referred to as a short-period speed VS.

For example, the distance from the detected position P14 to the detected position P15 shown in FIG. 6 is indicated by D1, and the distance from the detected position P24 to the detected position P25 shown in FIG. 7 is indicated by D2. Since the detected position P24 is shifted from the detected position P14 toward the guardrail 300, the distance D2 is longer than the distance D1 by which the detected vehicle 200 has actually moved. Here, since an elapsed time from the detection time T14 to the detection time T15 is equal to the detection cycle Cth, a short-period speed VS1 from the detected position P14 to the detected position P15 can be calculated on the basis of the following equation (3).

$$VS1=D1/Cth-Vm \tag{3}$$

Similarly, since an elapsed time from the detection time T24 to the detection time T25 is equal to the detection cycle Cth, a short-period speed VS2 from the detected position P24 to the detected position P25 can be calculated on the basis of the following equation (4).

$$VS2=D2/Cth-Vm \tag{4}$$

Since the detected position P14 and the detected position P15 are accurately detected as described above, the short-period speed VS1 can be regarded as being equal to the actual speed of the detected vehicle 200. On the other hand, since the distance D2 is longer than the distance D1 as described above, the short-period speed VS2 is higher than the short-period speed VS1. In other words, when the radar detected object is erroneously detected, the short-period speed VS may be greatly different from the actual speed of the radar detected object due to the influence of the erroneous detection. Thus, it is difficult to infer accuracy of the calculated track on the basis of the magnitude of the short-period speed VS.

On the other hand, due to the track determination process described above with reference to FIG. 4, the calculated long-period speed VL is unlikely to be influenced by the erroneous detection.

For example, in FIG. 7, the case is assumed where a long-period speed VL2 is calculated at the detection time T25 by the track determination process. Note that, on the basis of the processes at the above steps S91 and S92, the computing apparatus 12 previously sets the detected position P21 as the reference point Pd.

By the process at the above step S94, the computing apparatus 12 obtains a direct distance ΔL2 from the detected position P21 to the detected position P25. In addition, by the process at the above step S95, the computing apparatus 12 calculates an elapsed time ΔT from the detection time T21 to the detection time T25. Note that, since the detected position P is obtained four times from the detection time T21 to the detection time T25, the elapsed time ΔT corresponds to a time equal to four detection cycles Cth. Then, on the basis of the process at the above step S96, the computing apparatus 12 calculates the long-period speed VL2 according to the following equation (5).

$$VL2=\Delta L2/4Cth-Vm \quad (5)$$

Similarly, in FIG. 6, the case is assumed where the detected position P11 is set as the reference point Pd and a long-period speed VL1 is calculated at the detection time T25. Where the direct distance from the detected position P11 to the detected position P15 is a distance ΔL1 the computing apparatus 12 calculates the long-period speed VL1 according to the following equation (6). Note that the long-period speed VL1 indicates an accurate speed of the detected vehicle 200, which is calculated on the basis of the detected position P11 which is accurately detected.

$$VL1=\Delta L1/4Cth-Vm \quad (6)$$

Here, the position of the detected vehicle 200 is accurately detected at the detected position P21 and the detected position P25, and the detected position P21 and the detected position P25 correspond to the detected position P11 and the detected position P15, respectively. Thus, the distance ΔL1 is equal to the distance ΔL2. Therefore, according to equations (5) and (6), the long-period speed VL1 and the long-period speed VL2 are also equal to each other. Since the long-period speed VL1 indicates the accurate speed of the detected vehicle 200, the long-period speed VL2 also indicates the accurate speed of the detected vehicle 200.

As described above, even when the speed of the radar detected object cannot be accurately calculated as the short-period speed VS, it is possible to accurately calculate the speed of the radar detected object as the long-period speed VL calculated by the track determination process. Thus, according to the aforementioned process of the computing apparatus 12, it can be accurately determined, on the basis of the accurate long-period speed VL of the radar detected object, whether or not the calculated track is inaccurate.

Figure 8:
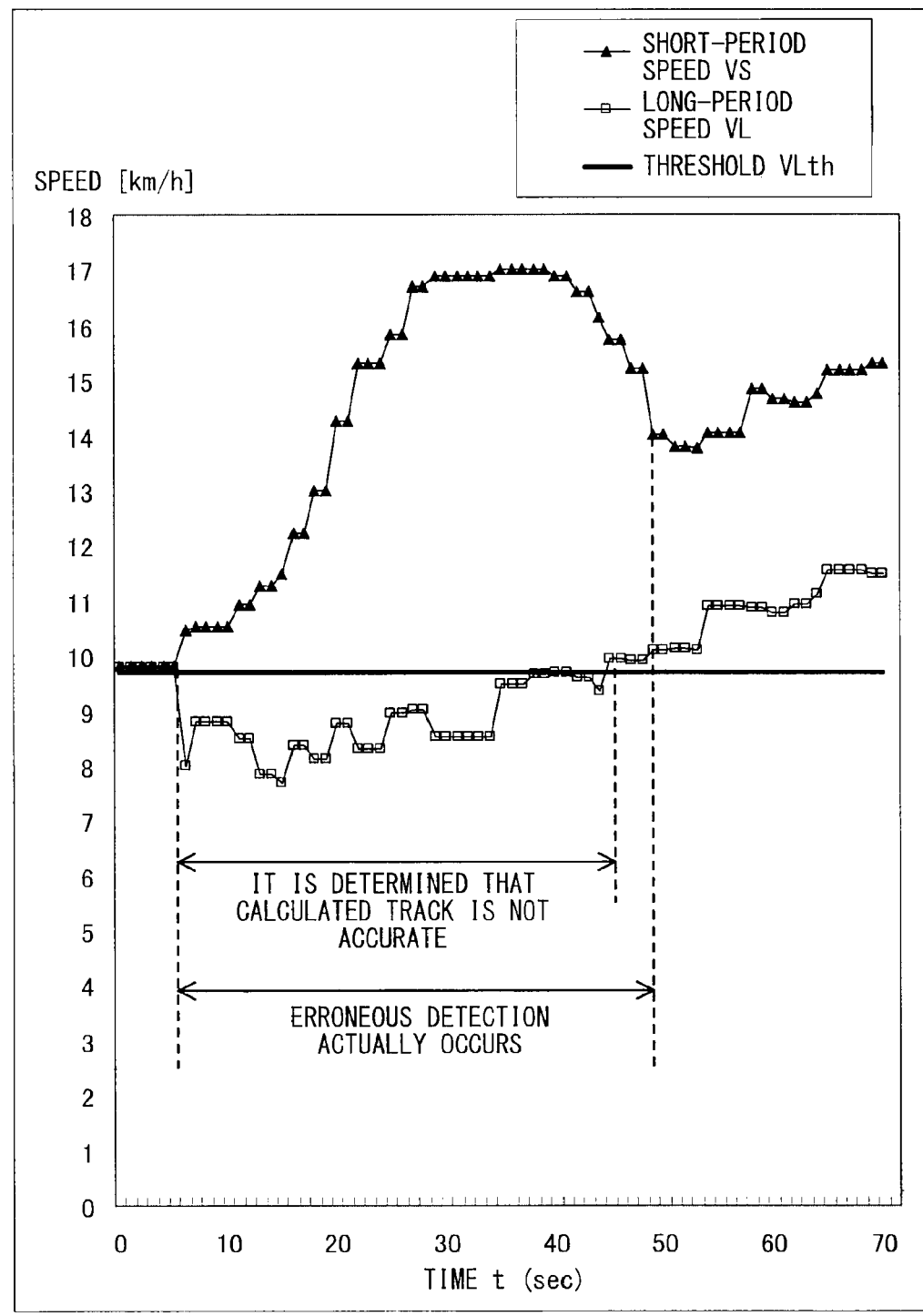
FIG. 8 is an example of a graph showing changes of a short-period speed VS and a long-period speed VL when erroneous detection occurs.

With reference to FIG. 8, the following will describe changes of the short-period speed VS and the long-period speed VL when erroneous detection occurs, and the situation will be described where the computing apparatus 12 determines whether or not the calculated track is accurate. FIG. 8 is an example of a graph showing the changes of the short-period speed VS and the long-period speed VL when the erroneous detection occurs.

In FIG. 8, the vertical axis indicates speed, and the horizontal axis indicates time. In the graph of FIG. 8, values of the short-period speed VS are plotted and indicated by triangles, and values of the long-period speed VL are plotted and indicated by squares. The detection cycle Cth elapses each time a time t increases by one in FIG. 8, and the computing apparatus 12 calculates a track of the radar detected object and performs a process of determining accuracy of the track.

In FIG. 8, from a time t of 5 to a time t of 49, the radar apparatus 11 erroneously detects another object as the radar detected object. As shown in FIG. 8, the value of the short-period speed VS increases and decreases between 0 and 17 km/h while the erroneous detection occurs. In addition, the value of the long-period speed VL increases and decreases between 7.5 and 10.0 km/h while the erroneous detection occurs. Further, when the erroneous detection occurs as shown in FIG. 8, the value of the difference between the short-period speed VS and the long-period speed VL tends to be large as compared to the case where erroneous detection does not occur.

Here, in order to determine that the calculated track is inaccurate when the value of the short-period speed VS is lower than a threshold, it is necessary to set the threshold so as to be equal to or higher than 17 km/h. However, when the threshold is set so as to be equal to or higher than 17 km/h, it is determined that the calculated track is inaccurate, even during a period, other than the period from the time t of 5 to the time t of 49, when erroneous detection actually does not occur.

On the other hand, the computing apparatus 12 sets the track inaccuracy flag to be ON, during the period from the time t of 5 to a time t of 45 when the long-period speed VL is lower than the value of the threshold VLth which is 9.7 km/h. In addition, the computing apparatus 12 sets the track inaccuracy flag to be OFF during a period, other than the period from the time t of 5 to the time t of 45, when the value of the long-period speed VL exceeds the threshold VLth. In other words, only during the period when the erroneous detection actually occurs, the computing apparatus 12 can determine that the calculated track is not accurate, by determining the accuracy of the calculated track on the basis of the long-period speed VL.

As described above, according to the radar system 1 of the first embodiment, it can be accurately determined whether or not the calculated track of the radar detected object is accurate.

Second Embodiment

The above-described first embodiment has described the example where the computing apparatus 12 determines whether or not the calculated track is accurate, on the basis of whether or not the long-period speed VL is higher than the threshold VLth. However, the computing apparatus 12 may determine whether or not the calculated track is accurate, on the basis of the difference value between the long-period speed VL and the short-period speed VS. The following will describe a process of a computing apparatus 12 according to a second embodiment with reference to FIG. 9.

Figure 9:
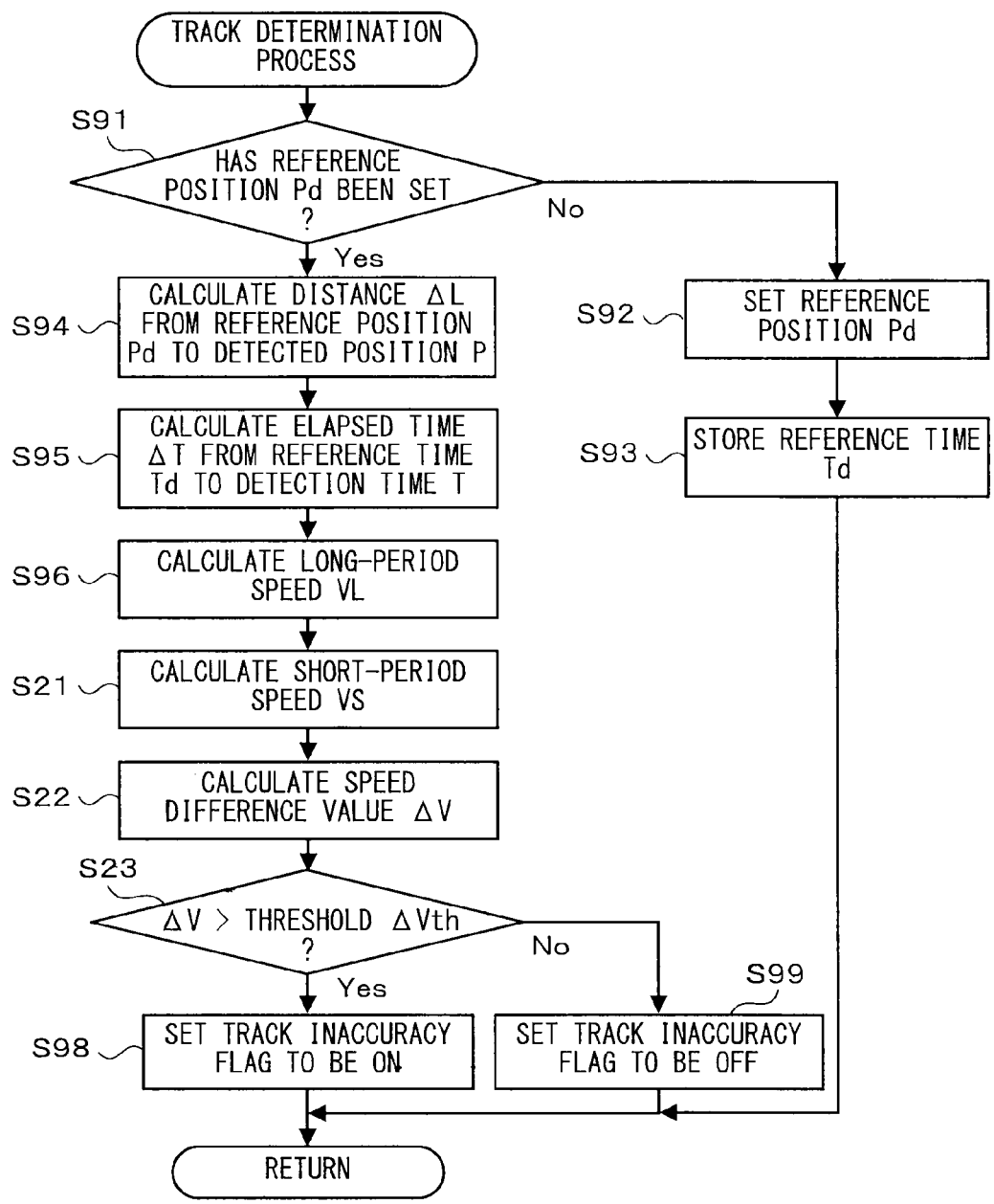
FIG. 9 is an example of a flowchart showing a track determination process according to a second embodiment.

Note that a configuration of a radar system according to the second embodiment is the same as that of the first embodiment, and thus the description thereof is omitted. In addition, the process of the computing apparatus 12 according to the second embodiment is different from that of the first embodiment in the subroutine of the track determination process performed at step S9, and is the same as that of the first embodiment in the other processes. Thus, only a track determination process according to the second embodiment will be described with reference to FIG. 9. FIG. 9 is an example of a flowchart showing the track determination process according to the second embodiment. In the flowchart of FIG. 9, steps at which the same processes as the aforementioned processes in FIG. 4 are performed are designated by the same reference characters, and the description thereof is omitted.

When starting the track determination process, the computing apparatus 12 according to the second embodiment performs the processes at steps S91 to S96 to calculate a long-period speed VL, similarly to the computing apparatus 12 according to the aforementioned first embodiment. Then, when the process at step S96 is completed, the computing apparatus 12 according to the second embodiment advances the processing to step S21.

At step S21, the computing apparatus 12 calculates a short-period speed VS. Specifically, first, the computing apparatus 12 calculates a direct distance D between a current detected position P and a detected position P plotted immediately prior to the current detected position P. Next, the computing apparatus 12 obtains a traveling speed Vm from the speedometer 13. Then, the computing apparatus 12 calculates a short-period speed VS on the basis of the following equation (7), and stores a calculated value of the short-period speed VS in the storage device.

$$VS = D/Cth - Vm \qquad (7)$$

When the process at step S21 is completed, the computing apparatus 12 advances the processing to step S22.

At step S22, the computing apparatus 12 calculates a speed difference value ΔV. The speed difference value ΔV is a value of the difference between the long-period speed VL and the short-period speed VS. The computing apparatus 12 calculates the speed difference value ΔV on the basis of the following equation (8), and stores the speed difference value ΔV in the storage device.

$$\Delta V = VS - VL \qquad (8)$$

When the process at step S22 is completed, the computing apparatus 12 advances the processing to step S23.

At step S23, the computing apparatus 12 determines whether or not the speed difference value ΔV is higher than a threshold ΔVth. The threshold ΔVth is a constant which is previously stored in the storage device of the computing apparatus 12. For example, the computing apparatus 12 stores a value of the threshold ΔVth as four in the storage device. The computing apparatus 12 reads out the speed difference value ΔV and the value of the threshold ΔVth from the storage device, and compares each value. When determining that the speed difference value ΔV is higher than the threshold ΔVth, the computing apparatus 12 advances the processing to step S98 and sets the track inaccuracy flag to be ON. On the other hand, when determining that the speed difference value ΔV is equal to or lower than the threshold ΔVth, the computing apparatus 12 advances the processing to step S99 and sets the track inaccuracy flag to be OFF.

Figure 10:
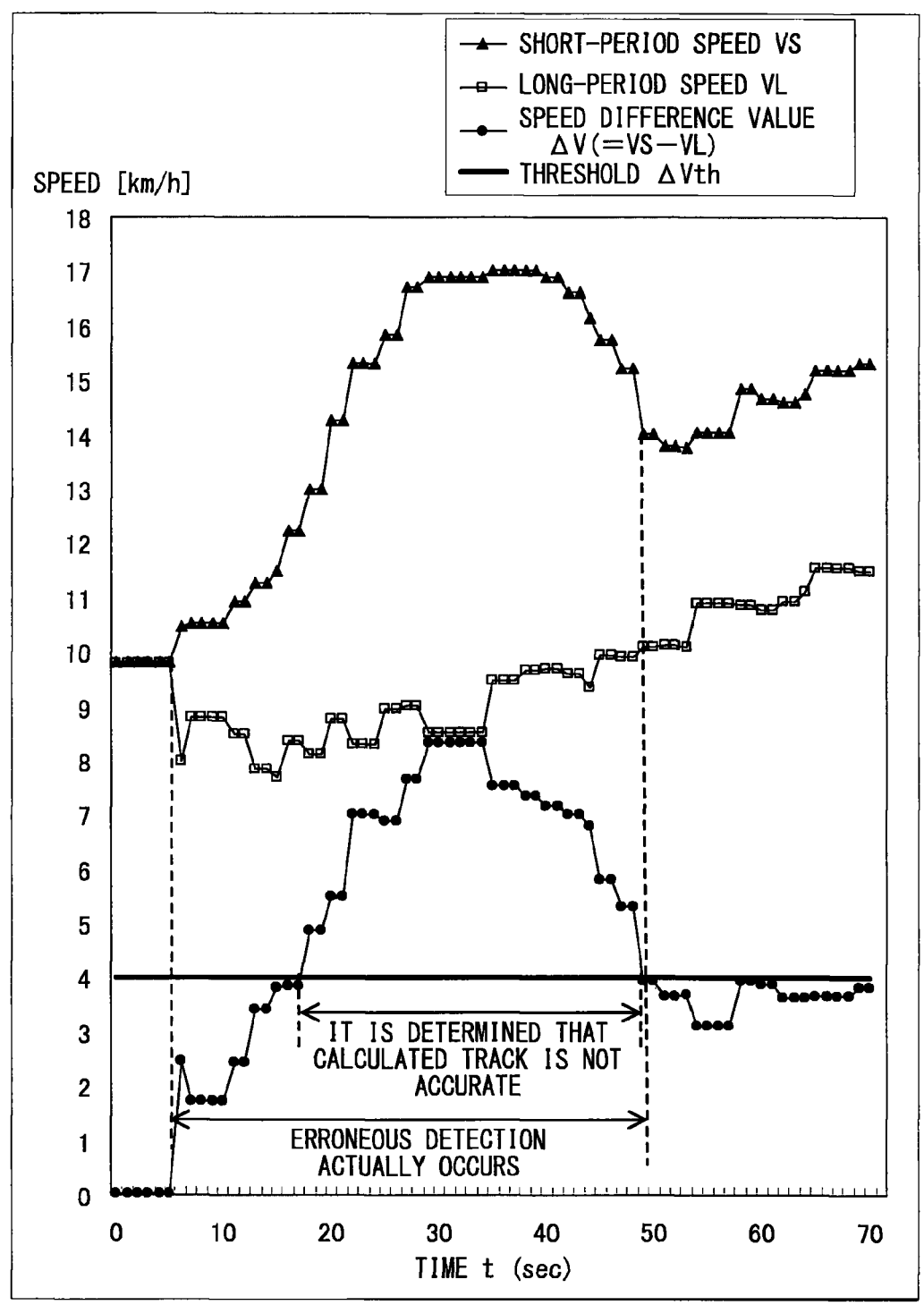
FIG. 10 is an example of a graph showing a change of a speed difference value ΔV when erroneous detection occurs.

With reference to FIG. 10, the following will describe a state of a change of the speed difference value ΔV when erroneous detection occurs. FIG. 10 is an example of a graph showing the change of the speed difference value ΔV when the erroneous detection occurs. FIG. 10 is a graph obtained by adding, to the graph of FIG. 8, the speed difference value ΔV which is calculated on the basis of the long-period speed VL and the short-period speed VS shown in the graph of FIG. 8. Thus, in FIG. 10, the long-period speed VL and the short-period speed VS shift similarly as described above with reference to FIG. 8. In FIG. 10, similarly to FIG. 8, from the time t of 5 to the time t of 49, the radar apparatus 11 erroneously detects another object as the radar detected object.

In FIG. 10, the speed difference value ΔV increases and decreases between 0.0 and 8.4. Here, during the period from the time t of 5 to the time t of 49 when the erroneous detection occurs, the speed difference value ΔV increases and decreases between 1.8 and 8.4. On the other hand, during a period from a time t of 0 to the time t of 5 when erroneous detection does not occur, the speed difference value ΔV shifts around 0.0. In other words, when the erroneous detection occurs, the speed difference value ΔV, namely, the difference value between the short-period speed VS and the long-period speed VL, tends to be large as compared to the case when erroneous detection does not occur.

Here, by the processes at the above steps S23, S98, and S99, the computing apparatus 12 sets the track inaccuracy flag to be ON during a period from a time t of 18 to the time t of 49 when the speed difference value ΔV is higher than the threshold ΔVth which is four. In addition, the computing apparatus 12 sets the track inaccuracy flag to be OFF during a period, other than the period from the time t of 18 to the time t of 45, when the value of the long-period speed VL exceeds the threshold VLth. In other words, only during the period when the erroneous detection actually occurs, the computing apparatus 12 can determine that the calculated track is not accurate, by determining the accuracy of the calculated track on the basis of the speed difference value ΔV.

As described above, according to the radar system of the second embodiment, it can be accurately determined whether or not the calculated track of the radar detected object is accurate. In addition, according to the radar system of the second embodiment, for example, even in the situation where the radar detected object is traveling at a speed higher than the threshold VLth in the first embodiment, it can be determined whether or not the above erroneous detection occurs, and it can be determined whether or not a track of the object is accurate.

The above second embodiment has described the example where the computing apparatus 12 calculates the long-period speed VL and the short-period speed VS as absolute speeds. However, the computing apparatus 12 may calculate the long-period speed VL and the short-period speed VS as relative speeds.

Specifically, in the process at the above step S96, the computing apparatus 12 may calculate the long-period speed VL on the basis of the following equation (9).

$$VL = \Delta L / \Delta T \qquad (9)$$

Further, in the process at the above step S21, the computing apparatus 12 may calculate the short-period speed VS on the basis of the following equation (10).

$$VS = D/Cth \qquad (10)$$

Even when the long-period speed VL and the short-period speed VS are either relative speeds or absolute speeds, the speed difference value ΔV, which is the value of the difference therebetween, is the same. Thus, even when the long-period speed VL and the short-period speed VS are calculated as relative speeds, the same effect is obtained as that when the long-period speed VL and the short-period speed VS are calculated as absolute speeds. Further, when the long-period speed VL and the short-period speed VS are calculated as relative speeds, computational complexity is reduced as compared to the case when the long-period speed VL and the short-period speed VS are calculated as absolute speeds. Thus, the processing load of the computing apparatus 12 can be reduced.

Further, the above second embodiment has described the example where the computing apparatus 12 determines whether or not the calculated track is accurate, on the basis of the difference value ΔV between the long-period speed VL and the short-period speed VS. However, the computing apparatus 12 may determine whether or not the calculated track is accurate, on the basis of a value obtained by dividing the short-period speed VS by the long-period speed VL.

Specifically, at the above step S22, the computing apparatus 12 calculates a speed division value ΔVd on the basis of the following equation (11), and stores the speed division value ΔVd in the storage device.

$$\Delta Vd = VS/VL \qquad (11)$$

Then, at step S23, the computing apparatus 12 determines whether or not the speed division value ΔVd is higher than a threshold ΔVdth. The threshold ΔVdth is a constant which is previously stored in the storage device of the computing apparatus 12. The computing apparatus 12 reads out the speed division value ΔVd and a value of the threshold ΔVdth from the storage device, and compares each value. When determining that the speed division value ΔVd is higher than the threshold ΔVdth, the computing apparatus 12 advances the processing to step S98 and sets the track inaccuracy flag to be ON. On the other hand, when determining that the speed division value ΔVd is equal to or lower than the threshold ΔVdth, the computing apparatus 12 advances the processing to step S99 and sets the track inaccuracy flag to be OFF.

Similarly to the speed difference value ΔV, the speed division value ΔVd is a value which becomes higher as the difference between the long-period speed VL and the short-period speed VS is larger. Thus, when the speed division value ΔVd is used as well, the accuracy of the calculated track can be determined similarly to the case when the speed difference value ΔV is used.

Third Embodiment

The above first embodiment has described the example where the computing apparatus 12 constantly performs the track determination process on the calculated track. However, in the situation when erroneous detection is unlikely to occur, the computing apparatus 12 may omit the track determination process. In addition, in the situation where a need for determining a risk of collision with the vehicle 100 is low, such as the case where a radar detected object is distantly present, a need for determining accuracy of a track is low. Therefore, when the radar detected object is distantly present as well, the track determination process may be omitted.

For example, in the situation where a radar detected object is close to the vehicle 100, the entirety of the electric wave transmitted from the radar apparatus 11 is applied to the radar detected object, and objects other than the radar detected object is not detected. Thus, in the situation where the radar detected object is close to the vehicle 100, the radar apparatus 11 is unlikely to erroneously detect another road-side object or the like as the radar detected object. Therefore, in such a situation, a calculated track is accurate, and hence the track determination process becomes unnecessary. In such a situation, in order to effectively use the limited processing capacity of the computing apparatus 12, it is desired that the track determination process is omitted to reduce the processing load of the computing apparatus 12.

Further, when the detected position P is set as the reference position Pd in the state where a radar detected object is distant from the vehicle 100, the possibility of a great change in the moving direction of the radar detected object is high as compared to the case where the reference position Pd is set to be near the vehicle 100. For example, when the radar detected object actually moves in a meandering manner, if the reference position Pd is set to be distant from the vehicle 100, the computing apparatus 12 may determine that the calculated track is not accurate, even though erroneous detection does not occur and the calculated track is accurate. Therefore, when the reference position Pd is set after the radar detected object is close to the vehicle 100 to some extent, and the track determination process is started, the accuracy of the calculated track can be more accurately determined. In other words, it is desired that the track determination process is omitted until the radar detected object is close to the vehicle 100.

Figure 11:
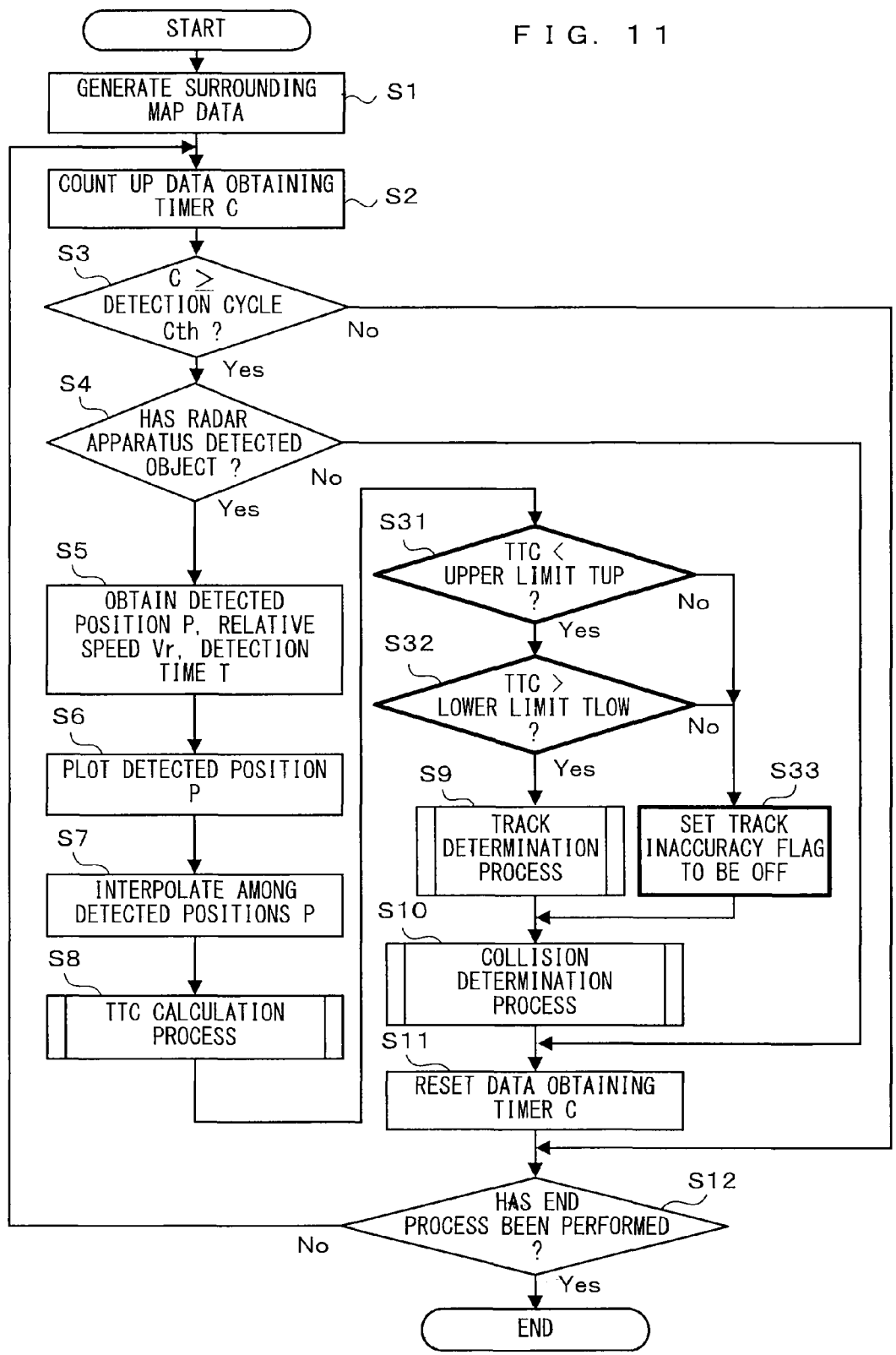
FIG. 11 is an example of a flowchart showing a process performed by a computing apparatus 12 according to a third embodiment.

The following will describe a process of a computing apparatus 12 according to the third embodiment with reference to FIG. 11. FIG. 11 is an example of a flowchart showing the process performed by the computing apparatus 12 according to the third embodiment. In the flowchart of FIG. 11, steps at which the same processes as the aforementioned processes in FIG. 2 are performed are designated by the same reference characters, and the description thereof is omitted. Note that a configuration of a radar system according to the third embodiment is the same as the configuration of the radar system 1 according to the first embodiment, and thus the description thereof is omitted.

The computing apparatus 12 according to the third embodiment performs the processes at steps S1 to S8 to calculate a track of the radar detected object and a predicted collision time TTC of the radar detected object, similarly to the computing apparatus 12 according to the aforementioned first embodiment. Then, when the process at step S8 is completed, the computing apparatus 12 according to the third embodiment advances the processing to step S31.

At step S31, the computing apparatus 12 determines whether or not the predicted collision time TTC is less than an upper limit time TUP. The upper limit time TUP is a constant which is previously stored in the storage device of the computing apparatus 12. The computing apparatus 12 reads out values of the predicted collision time TTC and the upper limit time TUP from the storage device, and compares each value. When determining that the predicted collision time TTC is less than the upper limit time TUP, the computing apparatus 12 advances the processing to step S32. On the other hand, when determining that the predicted collision time TTC is equal to or more than the upper limit time TUP, the computing apparatus 12 advances the processing to step S33.

At step S32, the computing apparatus 12 determines whether or not the predicted collision time TTC is more than a lower limit time TLOW. The lower limit time TLOW is a constant which is previously stored in the storage device of the computing apparatus 12 and is less than the upper limit time TUP. The computing apparatus 12 reads out the values of the predicted collision time TTC and the lower limit time TLOW from the storage device, and compares each value. When determining that the predicted collision time TTC is more than the lower limit time TLOW, the computing apparatus 12 advances the processing to step S9. On the other hand, when determining that the predicted collision time TTC is equal to or less than the lower limit time TLOW, the computing apparatus 12 advances the processing to step S33.

At step S33, the computing apparatus 12 sets the track inaccuracy flag to be OFF. Specifically, the computing apparatus 12 sets the state of the track inaccuracy flag to be OFF, and stores the set state of the flag in the storage device such that the original state of the flag is overwritten with the set state of the flag. When the process at step S33 is completed, the computing apparatus 12 advances the processing to step S10.

According to the processes at the above steps S31 to S33, the computing apparatus 12 performs the track determination process when the value of the predicted collision time TTC of the radar detected object is less than the upper limit time TUP and more than the lower limit time TLOW. Then, when the value of the predicted collision time TTC of the radar detected object is more than the upper limit time TUP, namely, when the radar detected object is distant from the vehicle 100, the track determination process can be omitted. Thus, according to the process of the computing apparatus 12 of the above third embodiment, erroneous determination in the track determination process can be reduced. In addition, when the value of the predicted collision time TTC of the radar detected object is equal to or more than the lower limit time TLOW, namely, when the radar detected object is close to the vehicle 100, the track determination process can be omitted. Thus, according to the process of the computing apparatus 12 of the third embodiment, the processing load of the computing apparatus 12 can be reduced when the track determination process is unnecessary.

Fourth Embodiment

The above third embodiment has described the example where it is determined whether or not to perform the track determination process, on the basis of the predicted collision time TTC. However, it may be determined whether or not to perform the track determination process, on the basis of the relative distance Lr from the vehicle 100 to the radar detected object. When it is determined whether or not to perform the track determination process on the basis of the relative distance Lr as well, the same effect as that of the third embodiment can be obtained.

Figure 12:
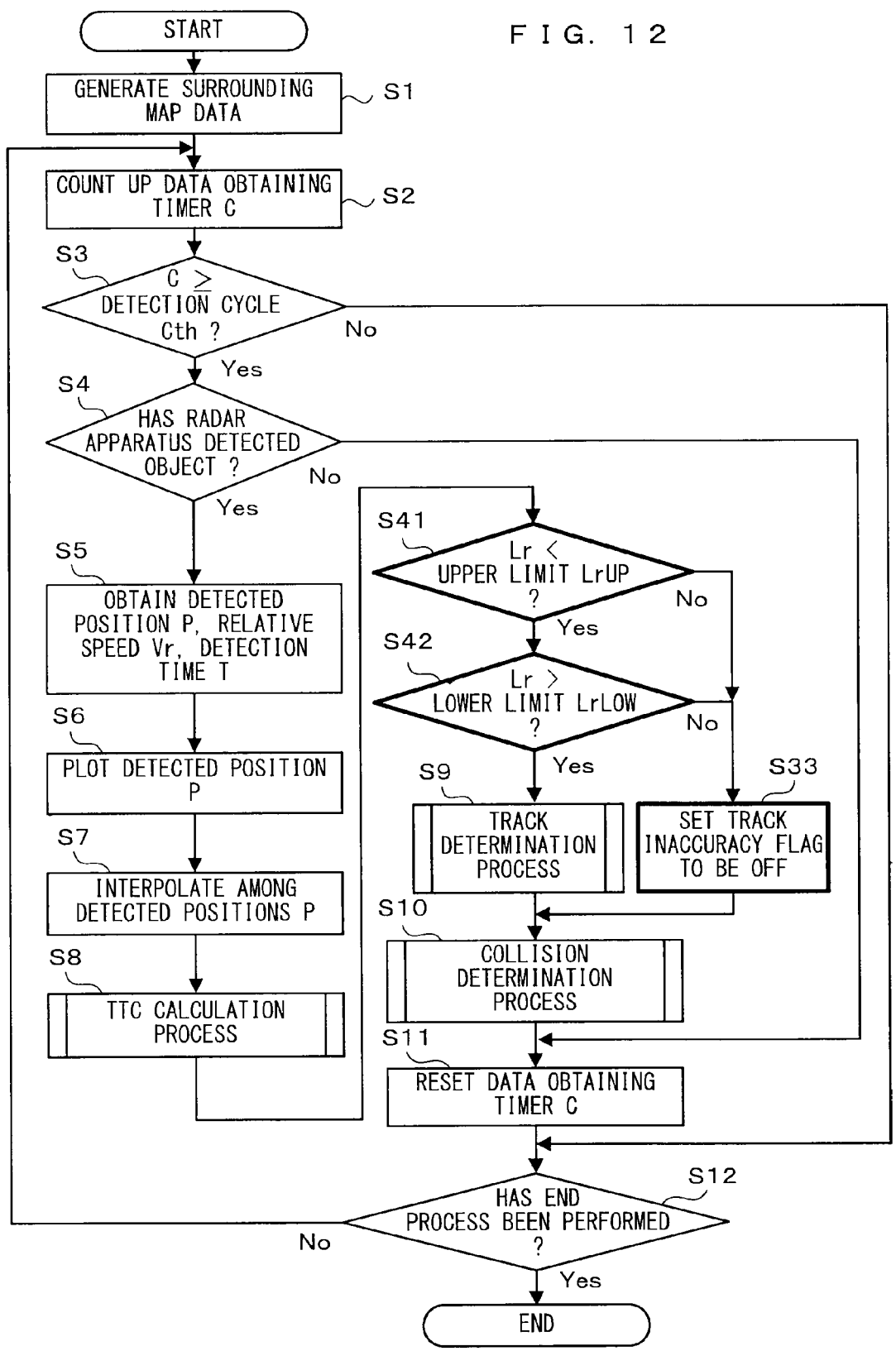
FIG. 12 is an example of a flowchart showing a process performed by a computing apparatus 12 according to a fourth embodiment.

The following will describe a process of a computing apparatus 12 according to a fourth embodiment with reference to FIG. 12. FIG. 12 is an example of a flowchart showing the processing performed by the computing apparatus 12 according to the fourth embodiment. In the flowchart of FIG. 12, steps at which the same processes as the aforementioned processes in FIG. 11 are performed are designated by the same reference characters, and the description thereof is omitted. Note that a configuration of a radar system according to the fourth embodiment is the same as the configuration of the radar system 1 according to the first embodiment, and thus the description thereof is omitted.

Similarly to the computing apparatus 12 according to the aforementioned first embodiment, the computing apparatus 12 according to the fourth embodiment performs the processes at steps S1 to S8 to obtain a value of the relative distance Lr and to calculate a track of the radar detected object. When the process at step S8 is completed, the computing apparatus 12 according to the fourth embodiment advances the processing to step S41.

Specifically, at step S41, the computing apparatus 12 determines whether or not the relative distance Lr is smaller than an upper limit distance LrUP. The upper limit distance LrUP is a constant which is previously stored in the storage device of the computing apparatus 12. The computing apparatus 12 reads out the values of the relative distance Lr and the upper limit distance LrUP from the storage device, and compares each value. When determining that the relative distance Lr is smaller than the upper limit distance LrUP, the computing apparatus 12 advances the processing to step S42. On the other hand, when determining that the relative distance Lr is equal to or larger than the upper limit distance LrUP, the computing apparatus 12 advances the processing to step S43.

At step S42, the computing apparatus 12 determines whether or not the relative distance Lr is larger than a lower limit distance LrLOW. The lower limit distance LrLOW is a constant which is previously stored in the storage device of the computing apparatus 12 and is smaller than the upper limit distance LrUP. The computing apparatus 12 reads out the values of the relative distance Lr and the lower limit distance LrLOW from the storage device, and compares each value. When determining that the relative distance Lr is larger than the lower limit distance LrLOW, the computing apparatus 12 advances the processing to step S9. On the other hand, when determining that the relative distance Lr is equal to or smaller than the lower limit distance LrLOW, the computing apparatus 12 advances the processing to step S33.

According to the processes at the above steps S41 and S42, the computing apparatus 12 can obtain the same effect as that of the radar system according to the above third embodiment. Specifically, when the value of the relative distance Lr of the radar detected object is smaller than the upper limit distance LrUP and larger than the lower limit distance LrLOW, the computing apparatus 12 according to the fourth embodiment performs the track determination process. Then, when the value of the relative distance Lr of the radar detected object is equal to or larger than the upper limit distance LrUP, namely, when the radar detected object is distant from the vehicle 100, the track determination process can be omitted. Thus, according to the process of the computing apparatus 12 of the above fourth embodiment, erroneous determination in the track determination process can be reduced. In addition, when the value of the relative distance Lr of the radar detected object is equal to or smaller than the lower limit distance LrLOW, namely, when the radar detected object is close to the vehicle 100, the track determination process can be omitted. Thus, according to the process of the computing apparatus 12 of the above fourth embodiment, the processing load of the computing apparatus 12 can be reduced when the track determination process is unnecessary.

Fifth Embodiment

Each of the above embodiments has described the example where the computing apparatus 12 constantly performs the track determination process on the calculated track. However, only when a calculated track is meandering, the computing apparatus 12 may perform the track determination process on the calculated track. When the radar apparatus 11 erroneously detects a road-side object as a radar detected object, it is thought that a calculated track has a curved shape which represents meandering. In other words, when a calculated track has a straight shape which represents straight traveling, namely, when the calculated track is not meandering, it is thought that the possibility of occurrence of the above erroneous detection is low, and thus it is unnecessary to perform the track determination process and the calculated track is accurate. Therefore, when a calculated track has a straight shape, or when the calculated track is not meandering, it is possible to omit the track determination process. The omission of this process allows a reduction in the processing load of the computing apparatus 12.

Figure 13:
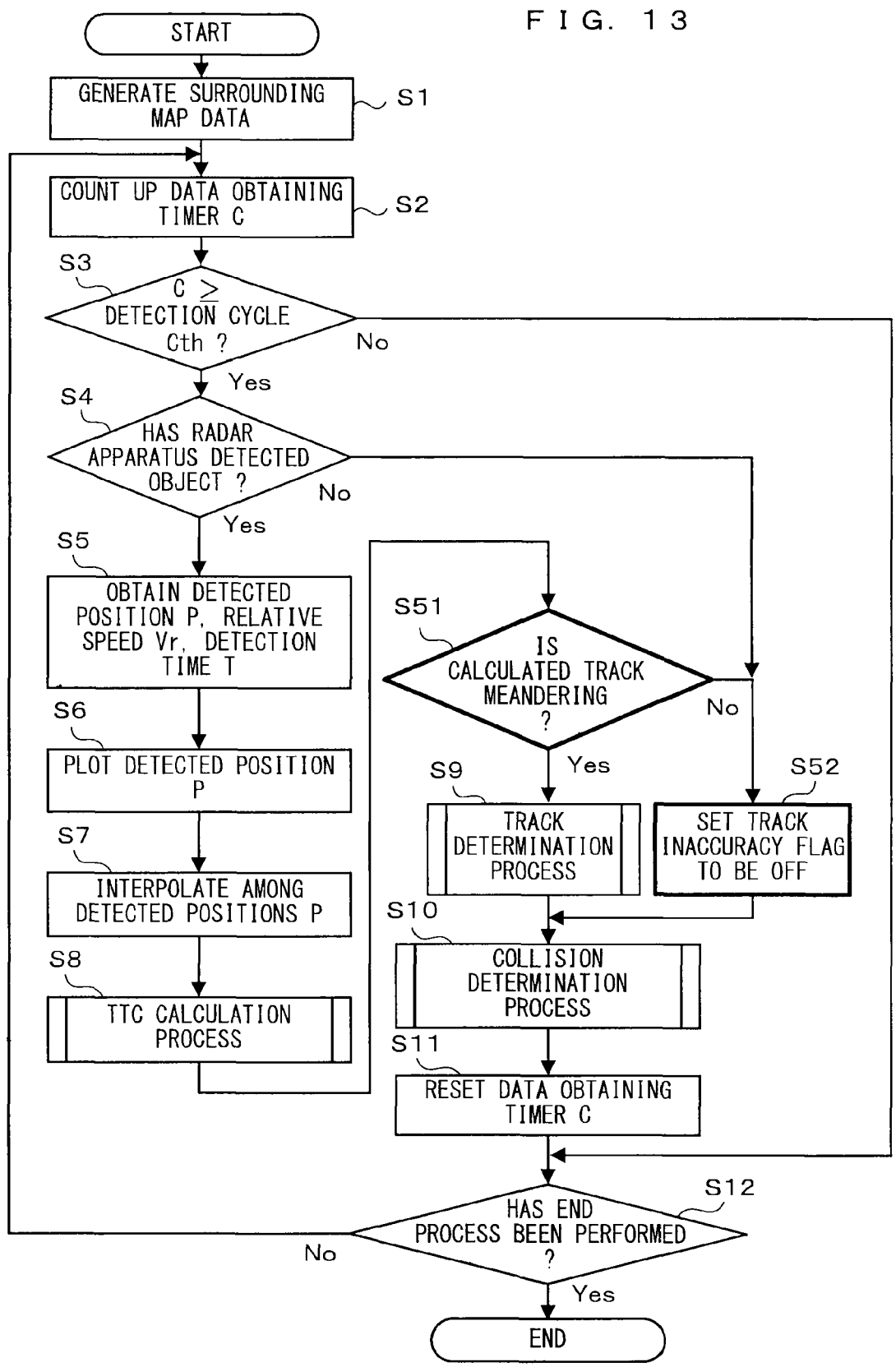
FIG. 13 is an example of a flowchart showing a process performed by a computing apparatus 12 according to a fifth embodiment.

The following will describe a process of a computing apparatus 12 according to a fifth embodiment with reference to FIG. 13. FIG. 13 is an example of a flowchart showing the process performed by the computing apparatus 12 according to the fifth embodiment. In the flowchart of FIG. 13, steps at which the same processes as the aforementioned processes in FIG. 2 are performed are designated by the same reference characters, and the description thereof is omitted. Note that a configuration of a radar system according to the fifth embodiment is the same as the configuration of the radar system 1 according to the first embodiment, and thus the description thereof is omitted.

Similarly to the computing apparatus 12 according to the aforementioned first embodiment, the computing apparatus 12 according to the fifth embodiment performs the processes at steps S1 to S8 to calculate a track of the radar detected object. When the process at step S8 is completed, the computing apparatus 12 according to the fifth embodiment advances the processing to step S51.

At step S51, the computing apparatus 12 determines whether or not the calculated track is meandering. As a method of determining whether or not the calculated track is meandering, any conventionally known method may be used. For example, the computing apparatus 12 calculates a vector obtained by straight-line approximation of the calculated track, and calculates a deviation of the distance to each detected position P constituting the calculated track, from the vector. When the deviation is higher than a predetermined threshold, the computing apparatus 12 determines that the calculated track is meandering. When determining that the calculated track is meandering, the computing apparatus 12 advances the processing to step S9 and performs the track determination process. On the other hand, when determining that the calculated track is not meandering, the computing apparatus 12 advances the processing to step S52.

At step S52, the computing apparatus 12 sets the track inaccuracy flag to be ON. Specifically, the computing apparatus 12 sets the state of the track inaccuracy flag to be OFF, and stores the set state of the flag in the storage device such that the original state of the flag is overwritten with the set state of the flag. When the process at step S52 is completed, the computing apparatus 12 advances the processing to step S10.

According to the processes at the above steps S51 and S52, the computing apparatus 12 performs the track determination process only when the calculated track is meandering, and the track determination process can be omitted when the calculated track is not meandering.

Sixth Embodiment

The example has been described where, in the collision determination process described in the above first embodiment, the computing apparatus 12 determines whether or not the risk of collision of the radar detected object with the vehicle 100 is high, on the basis of the predicted collision time TTC and the track inaccuracy flag. However, the computing apparatus 12 may determine whether or not the risk of collision of the radar detected object with the vehicle 100 is high, further on the basis of the calculated track.

Figure 14:
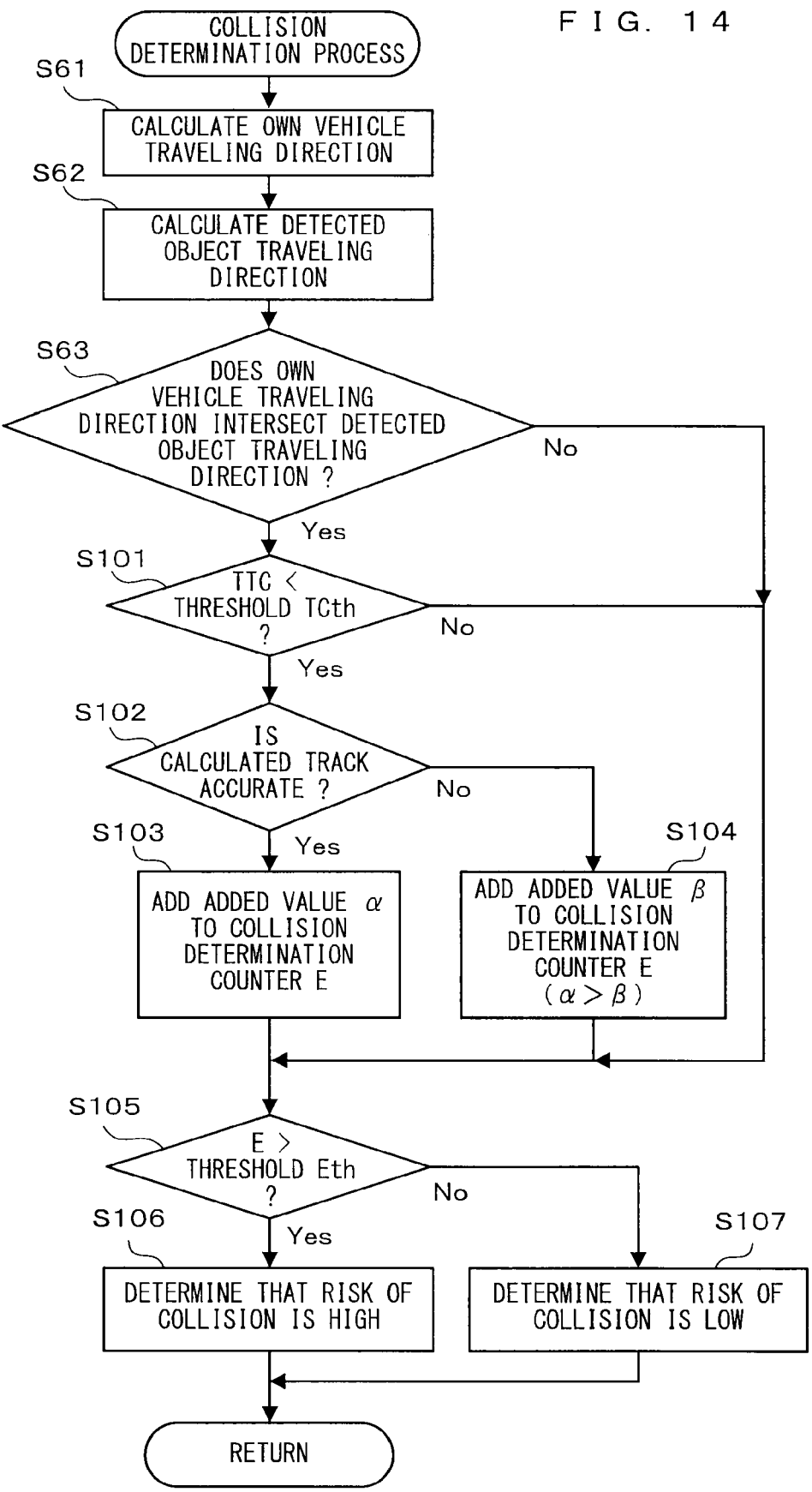
FIG. 14 is an example of a flowchart showing a collision determination process according to a sixth embodiment.

The following will describe a collision determination process according to a sixth embodiment with reference to FIG. 14. FIG. 14 is an example of a flowchart showing the collision determination process according to the sixth embodiment. In the flowchart of FIG. 14, steps at which the same processes as the aforementioned processes in FIG. 5 are performed are designated by the same reference characters, and the description thereof is omitted. Note that a configuration of a radar system according to the sixth embodiment is the same as the configuration of the radar system 1 according to the first embodiment, and thus the description thereof is omitted.

When starting a subroutine of the collision determination process, a computing apparatus 12 according to the sixth embodiment performs a process at step S61.

At step S61, the computing apparatus 12 calculates an own vehicle traveling direction. The own vehicle traveling direction is a directional vector on the surrounding map data, which indicates the traveling direction of the vehicle 100. For example, the computing apparatus 12 obtains a steering angle from a steering device of the vehicle 100, and calculates the own vehicle traveling direction on the basis of the steering angle. Note that the method of calculating the traveling direction of the vehicle 100 is not limited to the above method, and a conventionally known method may be used. When the process at step S61 is completed, the computing apparatus 12 advances the processing to step S62.

At step S62, the computing apparatus 12 calculates a detected object traveling direction. The detected object traveling direction is a vector on the surrounding map data, which indicates the traveling direction of the radar detected object. The computing apparatus 12 calculates the traveling direction of the radar detected object on the basis of the calculated track of the radar detected object. For example, the computing apparatus 12 performs straight-line approximation of the calculated track, and defines a direction indicated by the obtained straight line, as the detected object traveling direction. Note that the method of calculating the detected object traveling direction is not limited to the above method, and the detected object traveling direction may be calculated on the basis of the calculated track by using a conventionally known method. When the process at step S62 is completed, the computing apparatus 12 advances the processing to step S63.

At step S63, the computing apparatus 12 determines whether or not the own vehicle traveling direction intersects the detected object traveling direction. Specifically, the computing apparatus 12 calculates a straight line indicating the own vehicle traveling direction, and a straight line indicating the detected object traveling direction, on the surrounding map data, and determines whether or not these straight lines intersect each other. When the straight lines intersect each other, the computing apparatus 12 determines that the own vehicle traveling direction intersects the detected object traveling direction, and advances the processing to step S101. On the other hand, when the straight lines do not intersect each other, the computing apparatus 12 determines that the own vehicle traveling direction does not intersect the detected object traveling direction, and advances the processing to step S105.

Note that, at steps S101 to S107, the computing apparatus 12 performs the same processes as those in the aforementioned first embodiment, to determine whether or not the radar detected object will collide with the vehicle 100.

According to the processes at the above steps S61 to S63, it is determined, on the basis of the calculated track, whether or not the radar detected object and the vehicle 100 are close to each other, and it can be determined, on the basis of the result of the determination, whether or not the risk of collision of the radar detected object with the vehicle 100 is high.

Note that, although the example has been described where in the processes at the above steps S61 to S63, the computing apparatus 12 calculates the own vehicle traveling direction and the detected object traveling direction as the straight lines and determines whether or not these traveling directions intersect each other, the computing apparatus 12 may calculate the own vehicle traveling direction and the detected object traveling direction as curved lines and determines whether or not these traveling directions intersect each other on the basis of the curved lines. Specifically, for example, at step S62, the computing apparatus 12 performs curved-line approximation of the calculated track. Next, the computing apparatus 12 performs extrapolation of the obtained curved line, and calculates a curved line indicating the traveling direction of the radar detected object. Then, the computing apparatus 12 determines whether or not the curved line intersects the own vehicle traveling direction. Alternatively, the computing apparatus 12 may calculate each of the own vehicle traveling direction and the detected object traveling direction by combining the curved line and the straight line.

Each of the above embodiments has described the example where the computing apparatus 12 previously sets the reference position Pd, and calculates the long-period speed VL on the basis of the distance from the reference position Pd to the current detected position P. However, if the calculation is possible on the basis of the detected position P obtained at an interval which is longer than the detection cycle Cth, the position information of the radar detected object which is used by the computing apparatus 12 for calculating the long-period speed VL is not limited to the above. For example, the computing apparatus 12 may perform a process of calculating the long-period speed VL on the basis of the distance from the current detected position P to a detected position Pp which is plotted at a time point which is a defined time before. According to such a process, the computing apparatus 12 does not need to store data of detected positions P which are plotted prior to the detected position Pp, and thus the storage area of the storage device of the computing apparatus 12 can be reduced.

Further, each of the above embodiments has described the example where the driving support device 20 is the alarm device. However, the driving support device 20 is not limited to the alarm device as long as it is a device which operates in accordance with a risk of collision of the radar detected object with the vehicle 100. For example, the driving support device 20 may be a brake device which decreases the speed of the vehicle 100 in accordance with a risk of collision with the radar detected object.

INDUSTRIAL APPLICABILITY

The radar system according to the present invention is useful as a radar system which calculates a track of a detected object and can determine whether or not the track is accurate, or the like.

The invention claimed is:
1. A radar system comprising:
a radar section for emitting an electromagnetic wave to an object and receiving a reflected wave reflected from the object to detect position information of the object;
a track calculation section for calculating, periodically at a first cycle, a track along which the object moves, on the basis of the position information obtained from the radar section;
a first speed calculation section for calculating a first speed at which the object moves, on the basis of pieces of the position information at two different time points having a time interval which is longer than the first cycle; and
a track determination section for determining whether or not the track is accurate, on the basis of at least the first speed,
wherein the track determination section determines that the track is not accurately calculated, when the first speed is lower than a predetermined threshold.
2. The radar system according to claim 1, wherein
the radar system is mounted in a vehicle,
the radar system further comprises a predicted collision time calculation section for calculating a predicted collision time to collision of the object with the vehicle, and
only when the predicted collision time satisfies a predetermined condition, the track determination section performs the determination concerning the track.
3. The radar system according to claim 2, wherein the track determination section performs the determination concerning the track when the predicted collision time is longer than a predetermined lower limit time, and does not perform the determination concerning the track when the predicted collision time is equal to or shorter than the lower limit time.
4. The radar system according to claim 2, wherein the track determination section performs the determination concerning the track when the predicted collision time is shorter than a predetermined upper limit time, and does not perform the determination concerning the track when the predicted collision time is equal to or longer than the upper limit time.
5. The radar system according to claim 4, wherein the track determination section performs the determination concerning the track when the predicted collision time is shorter than the upper limit time and longer than a lower limit time which is previously set so as to be shorter than the upper limit time, and does not perform the determination concerning the track when the predicted collision time is equal to or shorter than the lower limit time or when the predicted collision time is equal to or longer than the upper limit time.
6. The radar system according to claim 4, wherein the first speed calculation section calculates the first speed on the basis of: a piece of the position information of the object at a current time; and a piece of the position information of the object at a time point when the predicted collision time becomes shorter than the upper limit time.

* * * * *